(12) United States Patent
Tabanou et al.

(10) Patent No.: US 7,467,045 B2
(45) Date of Patent: Dec. 16, 2008

(54) METHOD FOR ASSESSMENT OF UNCERTAINTY AND RISK

(75) Inventors: Eric Tabanou, Houston, TX (US);
Douglas A. Palkowsky, Katy, TX (US);
Albert Lu, Katy, TX (US); James P. Brady, La Jolla, CA (US); Daniel A. Neisch, Round Rock, TX (US)

(73) Assignee: Schlumberger Technology Corporation, Houston, TX (US)

( * ) Notice: Subject to any disclaimer, the term of this patent is extended or adjusted under 35 U.S.C. 154(b) by 29 days.

(21) Appl. No.: 11/650,722

(22) Filed: Jan. 8, 2007

(65) Prior Publication Data

US 2007/0179742 A1 Aug. 2, 2007

Related U.S. Application Data

(60) Provisional application No. 60/760,798, filed on Jan. 20, 2006.

(51) Int. Cl.
*G06F 19/00* (2006.01)

(52) U.S. Cl. .......................................... 702/13; 703/10
(58) Field of Classification Search ................... 702/13, 702/5, 16; 703/10
See application file for complete search history.

(56) References Cited

U.S. PATENT DOCUMENTS

2004/0220790 A1* 11/2004 Cullick et al. ................. 703/10

OTHER PUBLICATIONS

SPE 84439, "Using Visualization Tools to Gain Insight Into Your Data", Oct. 5, 2003.

* cited by examiner

*Primary Examiner*—Edward Raymond
(74) *Attorney, Agent, or Firm*—John Bouchard; Bryan Galloway

(57) ABSTRACT

A method is disclosed for assessing uncertainty comprising: creating a catalog for uncertainty areas; capturing quantitative and qualitative uncertainty data; establishing dependencies between uncertainties; associating risks to uncertainties; associating action plans and tasks to risks; creating a realization tree from uncertainty ranges; and tracking changes to uncertainties and realizations over time.

50 Claims, 19 Drawing Sheets

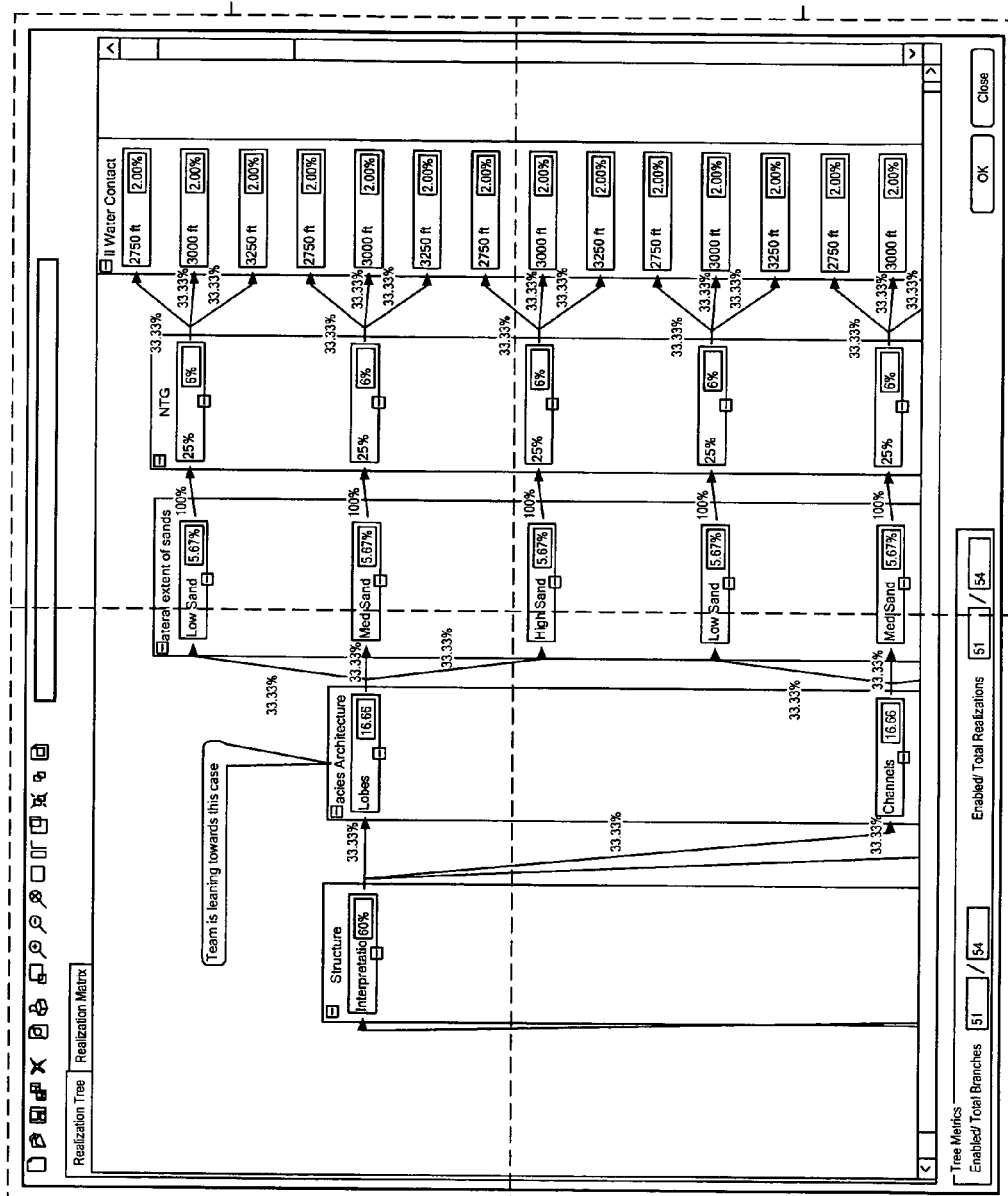

METHOD FOR ASSESSMENT OF UNCERTAINTY AND RISK

CROSS REFERENCE TO RELATED APPLICATIONS

This application is a Utility Application of prior Provisional Application Ser. No. 60/760,798 filed Jan. 20, 2006, and entitled 'Method, Apparatus, and System for Assessment of Uncertainty'.

BACKGROUND

This specification discloses a method, including a system and a program storage device and a computer program, for use in assessment of uncertainty.

The quantification of uncertainty and risk during the development of oil and gas reservoirs receives a significant amount of attention within the oil and/or gas Exploration and Production (E&P) industry. Today's asset teams are facing technical challenges in several different areas brought on by a rapidly changing landscape of field development. All of this leads to vast subsurface uncertainties that add to the already complex workflow of any integrated reservoir project. However, no available tools are capable of recording both the qualitative and quantitative assessments of uncertainty and then visualizing and analyzing how these uncertainties evolve over time. That is, no tools exist for formally reviewing the risk evolution of hydrocarbon projects over the life of the asset. Such a review helps both to balance risk across a company's oil and gas portfolio but also to design acquisition programs geared towards reducing the financial risk while improving reserves knowledge.

A Society for Petroleum Engineers (SPE) paper 84439 (SPE 84439) is dated Oct. 5, 2003, and is entitled "Using Visualization Tools to Gain Insight into Your Data". The aforementioned SPE paper (SPE 84439) is incorporated by reference into the specification of this application.

SUMMARY

One aspect of the present invention is to provide a method and system and program storage device and computer program for assessing uncertainty while eliminating or minimizing the impact of the problems and limitations described.

Another aspect of the present invention includes a method for assessing uncertainty including the steps of creating (and updating) a catalog for uncertainty areas; capturing quantitative and qualitative uncertainty data; establishing dependencies between uncertainties; associating risks to uncertainties; associating action plans and tasks to risks; creating a realization tree from uncertainty ranges; and tracking changes to uncertainties and realizations over time.

Another aspect of the present invention includes a program storage device with programming for implementing the steps of creating (and updating) a catalog for uncertainty areas; capturing quantitative and qualitative uncertainty data; establishing dependencies between uncertainties; associating risks to uncertainties; associating action plans and tasks to risks; creating a realization tree from uncertainty ranges; and tracking changes to uncertainties and realizations over time.

Another aspect of the present invention includes a system for implementing the steps of creating (and updating) a catalog for uncertainty areas; capturing quantitative and qualitative uncertainty data; establishing dependencies between uncertainties; associating risks to uncertainties; associating action plans and tasks to risks; creating a realization tree from uncertainty ranges; and tracking changes to uncertainties and realizations over time.

Another aspect of the present invention involves a method of uncertainty management adapted for managing uncertainties and risks during the development of a reservoir, comprising: determining a set of uncertainties pertaining to the development of the reservoir, the set of uncertainties including qualitative information and quantitative information, the uncertainties being reduced in response to development of the reservoir; and continuously changing the qualitative information and the quantitative information associated with the set of uncertainties when the uncertainties are reduced in response to development of the reservoir.

Another aspect of the present invention involves a program storage device readable by a machine tangibly embodying a program of instructions executable by the machine to perform method steps for uncertainty management adapted for managing uncertainties and risks during the development of a reservoir, the method steps comprising: determining a set of uncertainties pertaining to the development of the reservoir, the set of uncertainties including qualitative information and quantitative information, the uncertainties being reduced in response to development of the reservoir; and continuously changing the qualitative information and the quantitative information associated with the set of uncertainties when the uncertainties are reduced in response to development of the reservoir.

Another aspect of the present invention involves a computer program adapted to be executed by a processor, the program, when executed by the processor, conducting a process for uncertainty management adapted for managing uncertainties and risks during the development of a reservoir, the process comprising: determining a set of uncertainties pertaining to the development of the reservoir, the set of uncertainties including qualitative information and quantitative information, the uncertainties being reduced in response to development of the reservoir; and continuously changing the qualitative information and the quantitative information associated with the set of uncertainties when the uncertainties are reduced in response to development of the reservoir.

Further scope of applicability will become apparent from the detailed description presented hereinafter. It should be understood, however, that the detailed description and the specific examples set forth below are given by way of illustration only, since various changes and modifications within the spirit and scope of the 'Uncertainty Management Software', as described and claimed in this specification, will become obvious to one skilled in the art from a reading of the following detailed description.

BRIEF DESCRIPTION OF THE DRAWINGS

A full understanding will be obtained from the detailed description presented hereinbelow, and the accompanying drawings which are given by way of illustration only and are not intended to be limitative to any extent, and wherein:

FIG. 11, including

DETAILED DESCRIPTION

Figure 5A:
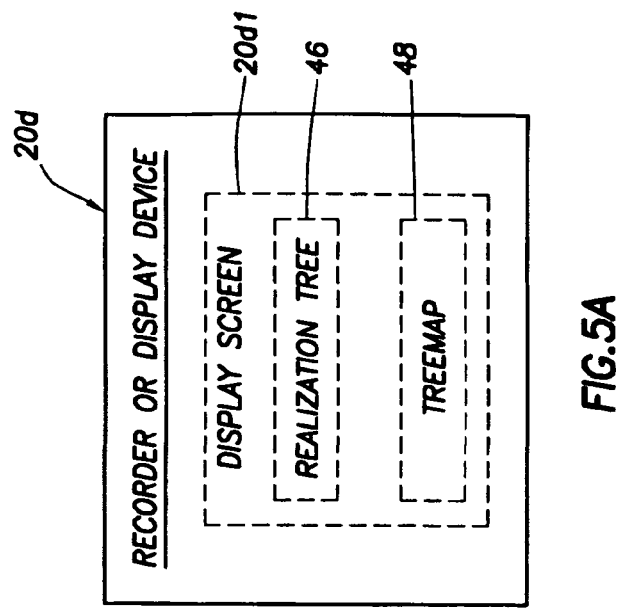
FIG. 5A illustrates the Display Screen of the Recorder or Display device of the computer system of FIG. 3, wherein the Display Screen is adapted to display a Realization Tree and a Treemap.

In the following detailed description, reference is made to the accompanying drawings. It is understood; however, that those of skilled in the art may readily ascertain other embodiments and changes that may be made to the detailed description set forth hereinbelow without departing from the spirit and scope of the invention.

This specification discloses a method, including a system and a program storage device and a computer program, for use in assessment of uncertainty. In particular, this specification provides a method, system, computer program, and program storage device whereby quantitative and qualitative (through a variety of media) measures of technical uncertainty, arising for example in the oil and gas industry, may be entered and recorded by members of an asset team associated with the variety of sub surface technical domains. The measures may be combined to assess and measure the overall reservoir risk by designing various scenarios that may then be quantitatively evaluated in a Reservoir Modeling Tool. Further the present invention provides a way of viewing how both how these uncertainties combine at a particular point in time and how they evolve over time as new data or new insight is acquired. The invention thus also serves as a management review tool for better tracking the decisions leading to the valuation of reserves and/or to justify the need for further investment.

The quantification of uncertainty and risk during the development of oil and gas reservoirs receives a significant amount of attention within the exploration and production ("E&P" or oil and gas) industry. There are many commercial and non-commercial tools and techniques available to capture and model the numerical uncertainty and even to propagate the uncertainty in one domain into the evaluation space of another domain. Examples include standard techniques for simulating the production forecast given uncertainty of the position of the Oil Water Contact or of the field porosity distribution. Capture techniques typically include the entry of confidence intervals on marker or seismic picks which can be stored in a database. Today's asset teams are facing technical challenges in several different areas brought on a by rapidly changing landscape of field development. Most of the older "brown field" reservoirs are depleted, and many are compartmentalized and/or of poor reservoir quality. New discoveries are smaller with deeper, high pressure, high temperature, and layered reservoirs. All of this leads to vast subsurface uncertainties that add to the already complex workflow of any integrated reservoir project. Almost all these projects now require multiple field development scenarios and iterative field-level economic evaluations using enabling software that demand greater specialization. To further compound the problem, the most efficient technical workflow requires collaboration across disciplines and functions in an environment where business processes mostly exist in silos with little cross-functional integration. Finally, asset teams routinely cite data access and data management to be the number one problem frustrating progress in hydrocarbon development. Data and information is difficult to find and access and sometimes there is a poor level of confidence in the quality of the data. In addition, data is stored on users' personal drives, thus making integration and collaboration difficult. However, the approaches to addressing uncertainty available today have some important disadvantages, specifically: no available tools are capable of recording both the qualitative and quantitative assessments of uncertainty and then visualizing and analyzing how these uncertainties evolve over time. Techniques to do this today are ad hoc, single user and non-uniform throughout an organization or even throughout an asset team. As such, no tools exist for formally reviewing the risk evolution of hydrocarbon projects over the life of the asset. Such a review helps both to balance risk across a company's oil and gas portfolio but also to design acquisition programs geared towards reducing the financial risk while improving reserves knowledge.

Figure 1:
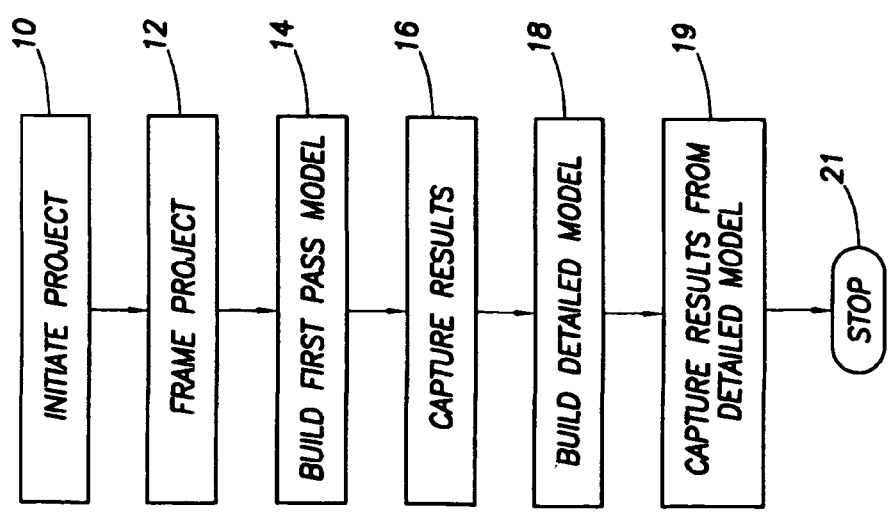
FIG. 1 illustrates a typical 'hydrocarbon development process'.

Referring to FIG. 1, a typical 'hydrocarbon development process' is illustrated.

Figure 2:
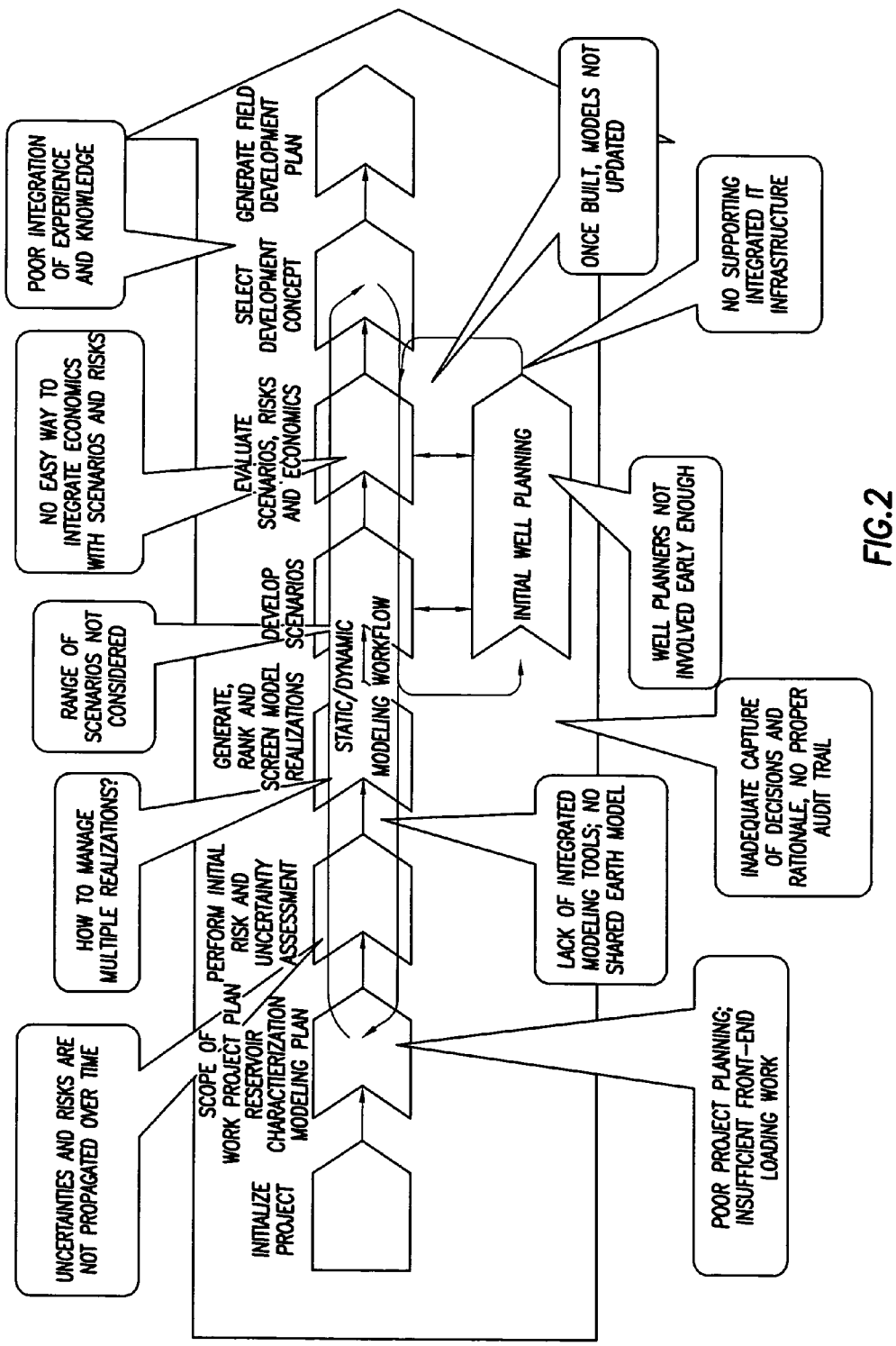
FIG. 2 illustrates technical and workflow complexities in a typical hydrocarbon development process.

In FIG. 1, the typical 'hydrocarbon development process' begins when a project is initiated, step 10. The project is framed, step 12. A first pass model is built, step 14. Results are captured, step 16. The detailed model is built, step 18. Results from the detailed model are captured, step 19, and the process ends, step 21. Note that there are sub-processes within steps 14, 16, 18, and 19, as follows: a user-interface is a web-based environment that preferably uses Schlumberger's 'DecisionPoint solution', a product that is owned and operated by Schlumberger Technology Corporation of Houston, Texas. The underlying business process modeling and execution is preferably based on 'AgilePoint', which is a NET Business Process Management Engine. 'AgilePoint' is a scalable BPM Engine, which, through use of process templates, supports both human workflow and automated processes. However, the 'hydrocarbon development process' of FIG. 1 can exhibit certain 'technical and workflow complexities', as illustrated in FIG. 2. On the other hand, these 'technical and workflow complexities' associated with the 'hydrocarbon development process' of FIG. 1 can be eliminated by utilizing the 'Uncertainty Management Software' as illustrated in FIGS. 3 and 4, which will be discussed later in this specification.

Referring to FIG. 2, the 'technical and workflow complexities' inherent in the typical 'hydrocarbon development process' of FIG. 1, are illustrated.

In FIG. 2, a 'hydrocarbon development process' may include the following: (1) initialize project, (2) Scope of project plan, reservoir characterization, modeling plan, (3) perform initial risk and uncertainty assessment, (4) generate risk and screen model realizations, (5) develop scenarios, (6) evaluate scenarios, risks, and economics, (7) select development concept, and (8) generate field development. However, note the following 'technical and workflow complexities' which exist in relation to the aforementioned 'hydrocarbon development process': (1) Poor project planning, insufficient front end loading work, (2) uncertainties and risks are not propagated over time, (3) lack of integrated modeling tools, no shared earth model, (4) How to manage multiple realizations?, (5) inadequate capture of decisions and rationale, no proper audit trail, (6) range of scenarios not considered, (7) well planners not involved early enough, (8) no easy way to integrate economics with scenarios and risks, (9) no supporting integrated IT infrastructure, (10) poor integration of experience and knowledge, and (11) once built, models are not updated.

Figure 3:
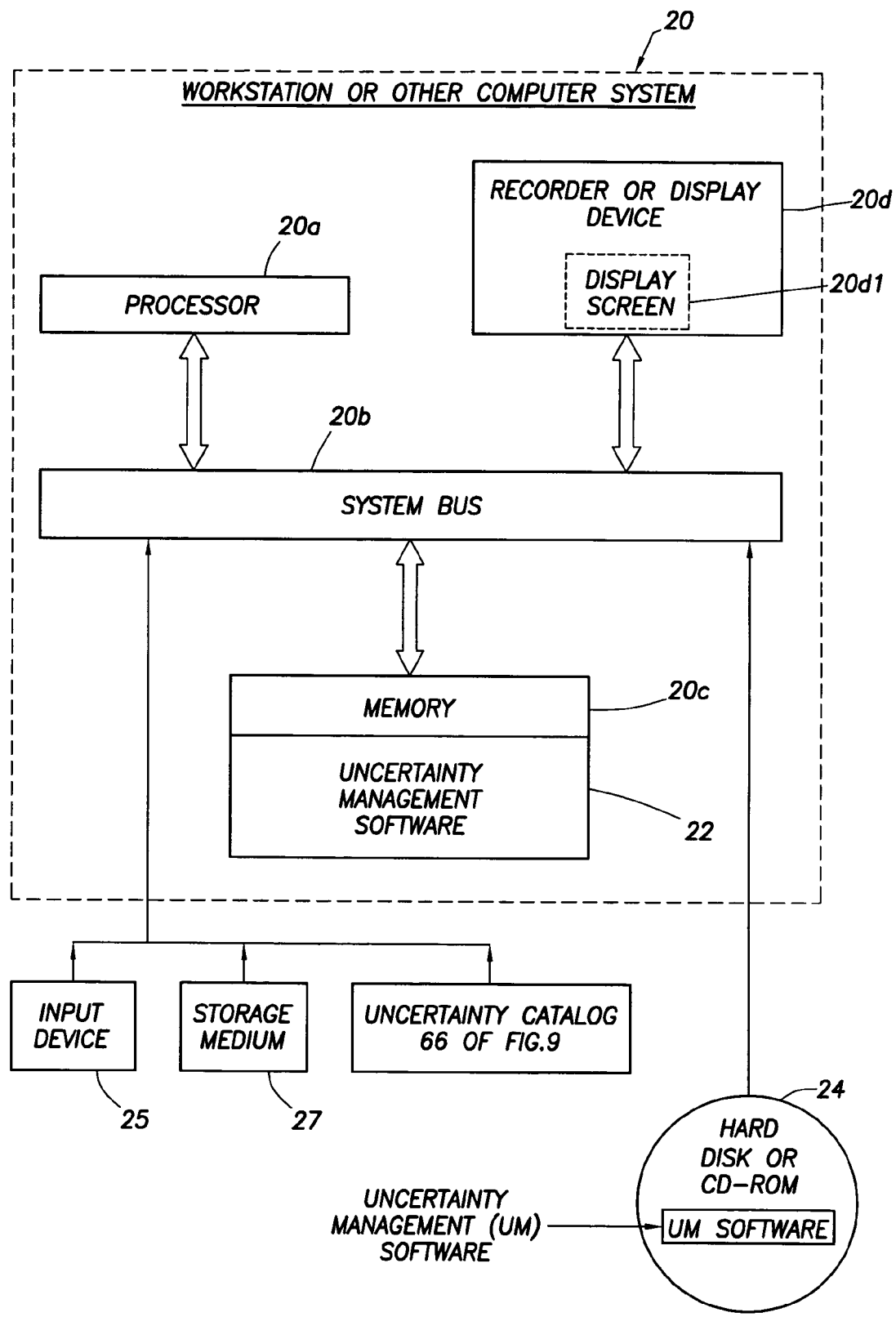
FIG. 3 illustrates a computer system and a hard disk which stores an Uncertainty Management Software.
Figure 4:
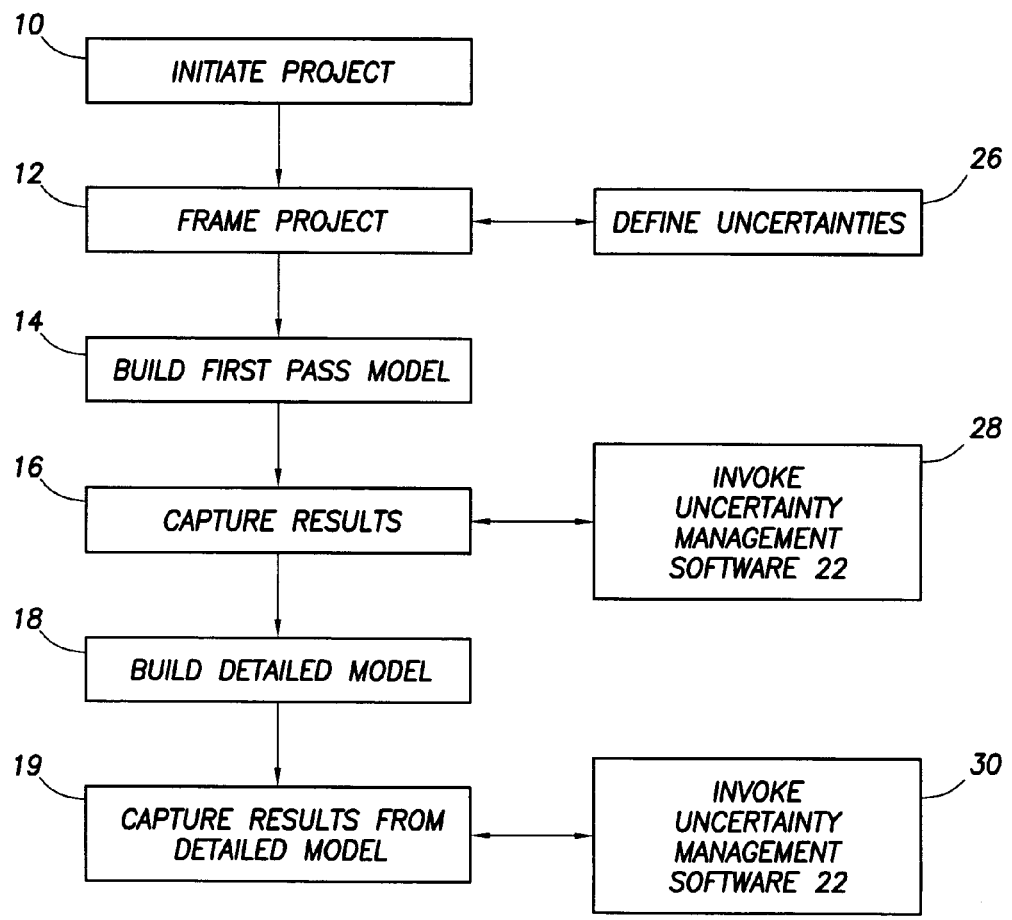
FIG. 4 illustrates the 'hydrocarbon development process' of FIG. 1; however this 'hydrocarbon development process' will define uncertainties and then invoke the Uncertainty Management Software that is stored in the computer system and/or hard disk shown in FIG. 3.

Referring to FIG. 3, a workstation or other computer system 20 is illustrated which stores the 'Uncertainty Management Software' that is disclosed in this specification.

Figure 5:
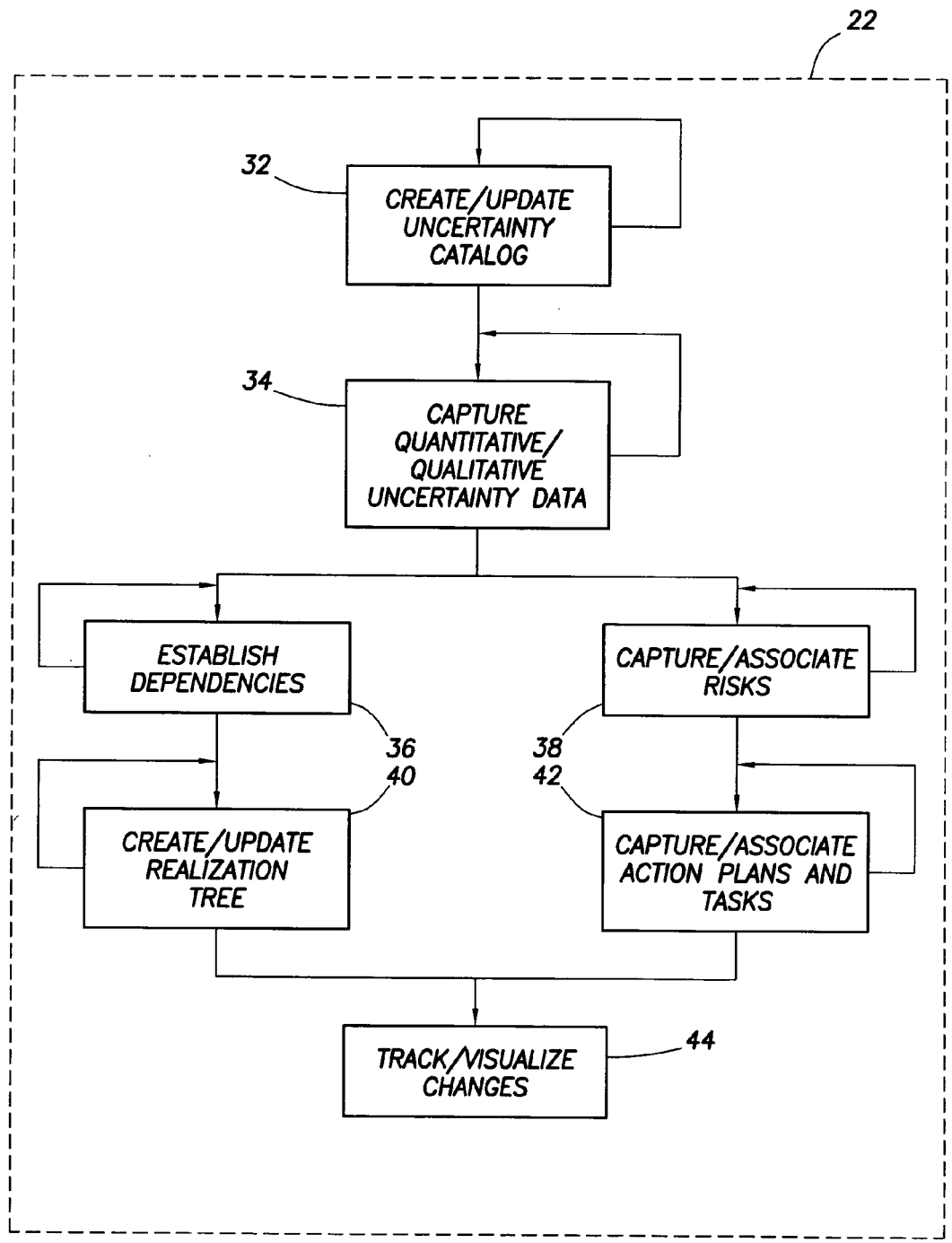
FIG. 5 illustrates a plurality of process steps associated with uncertainty management which are practiced by the Uncertainty Management Software stored in the computer system and/or hard disk of FIG. 3, especially in conjunction with the 'hydrocarbon development process' of FIG. 4.
Figure 6:
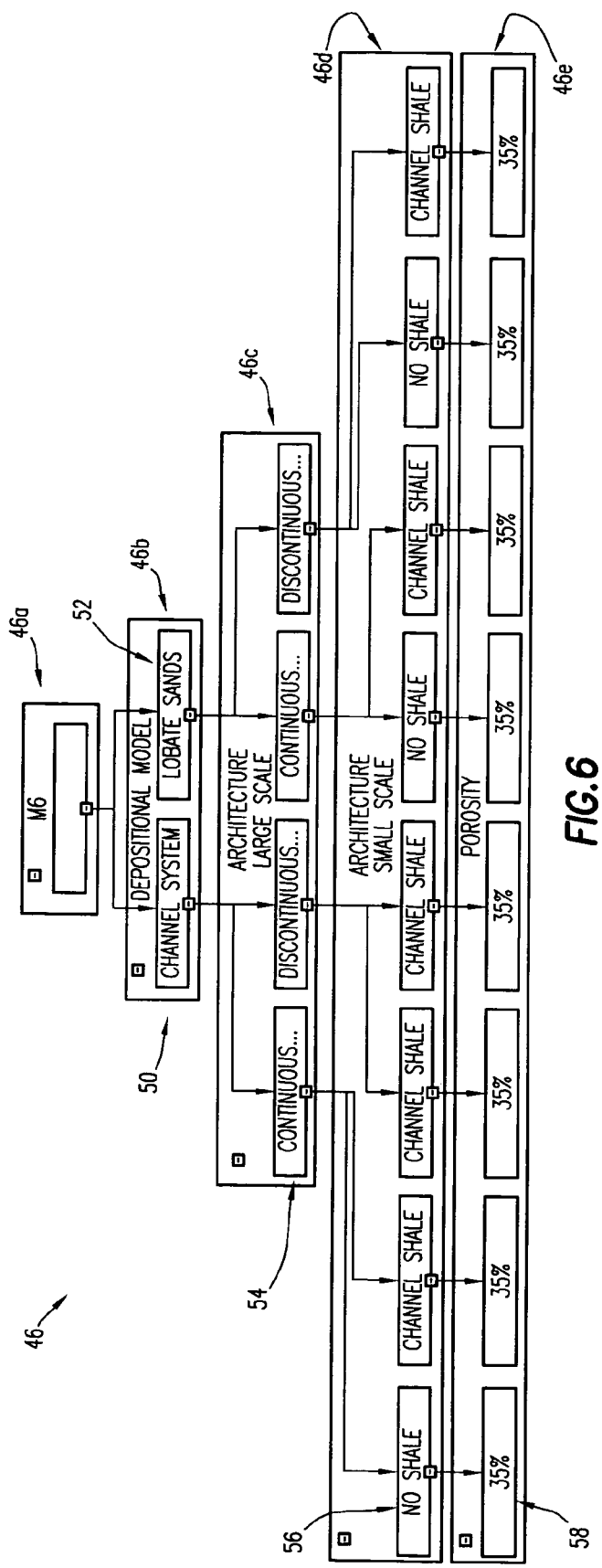
FIG. 6 illustrates a simplified Realization Tree.
Figure 7:
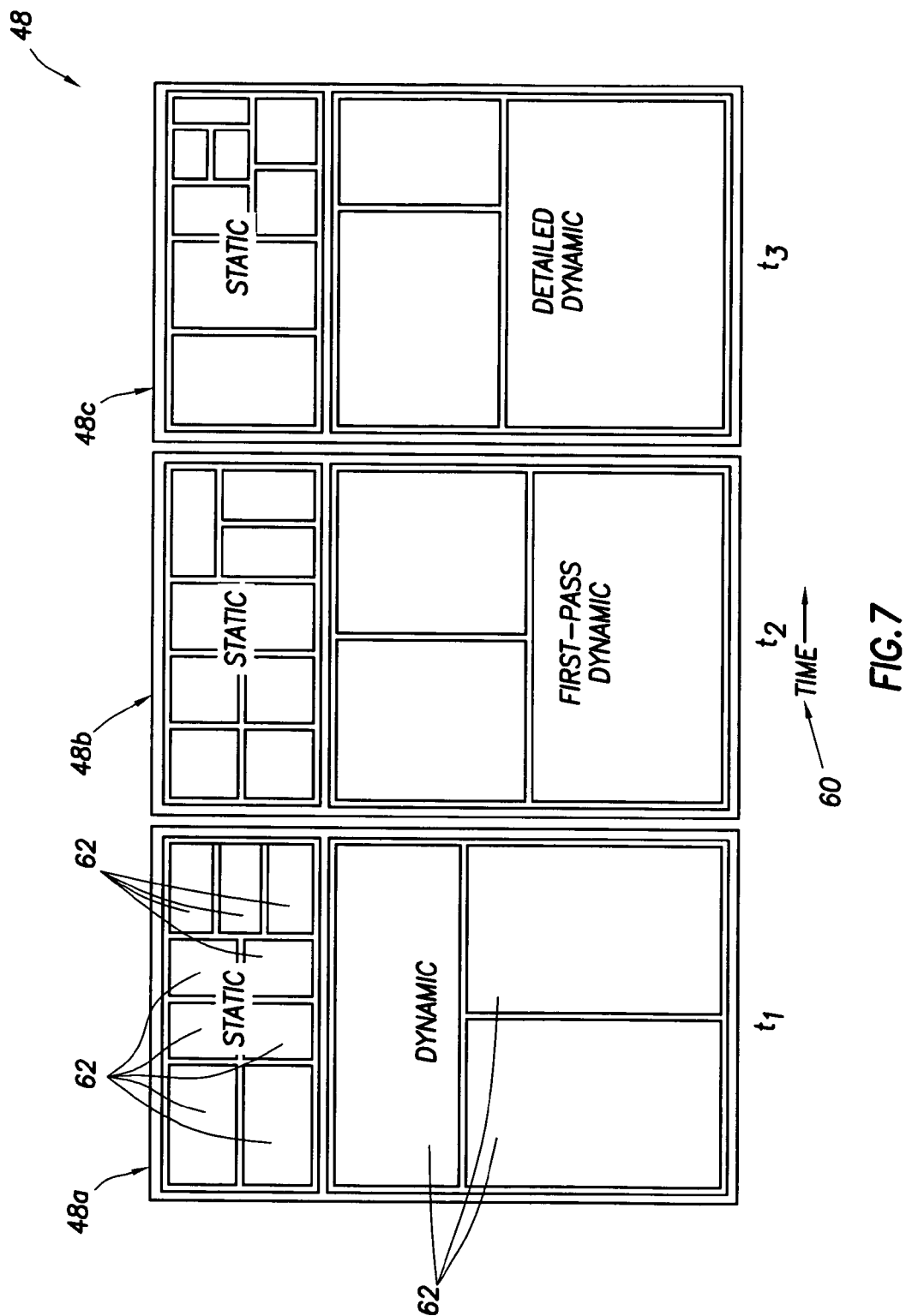
FIG. 7 illustrates a Treemap, the Treemap allowing a user to visualize changes to uncertainties at certain key milestones over time.
Figure 8:
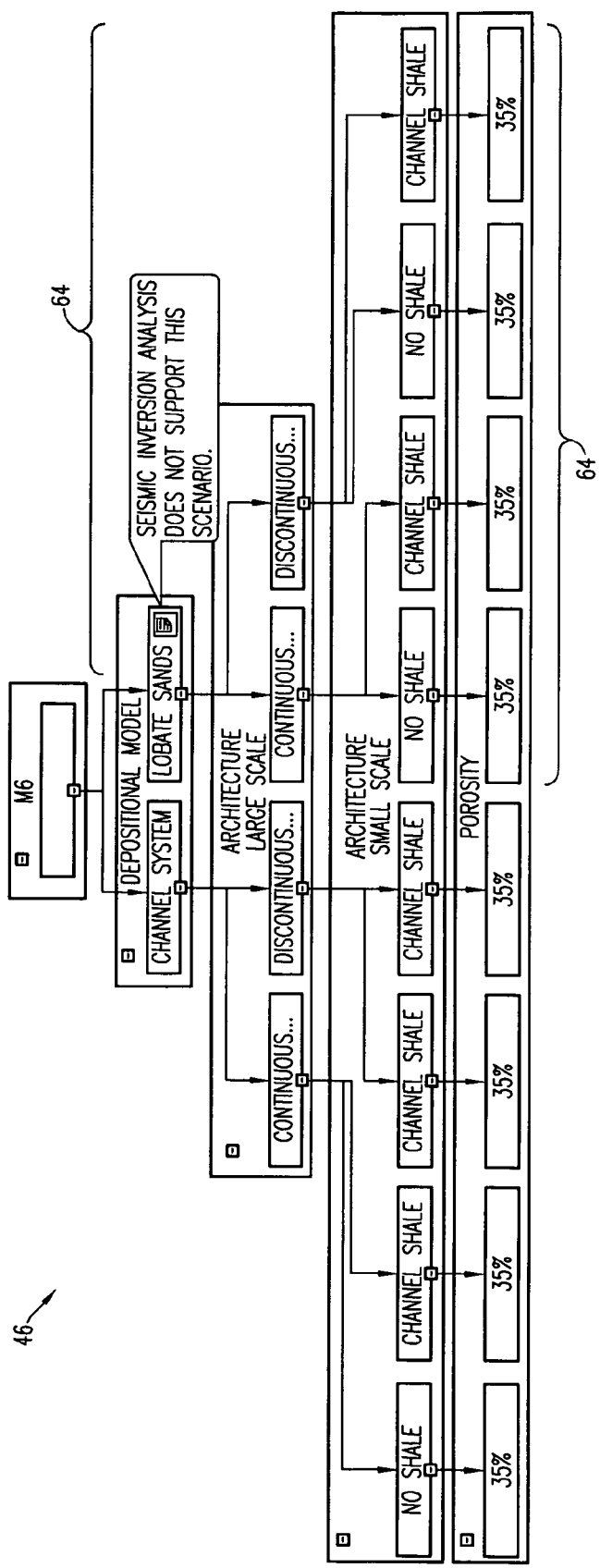
FIG. 8 illustrates a Realization Tree with Pruned Realizations.
Figure 9:
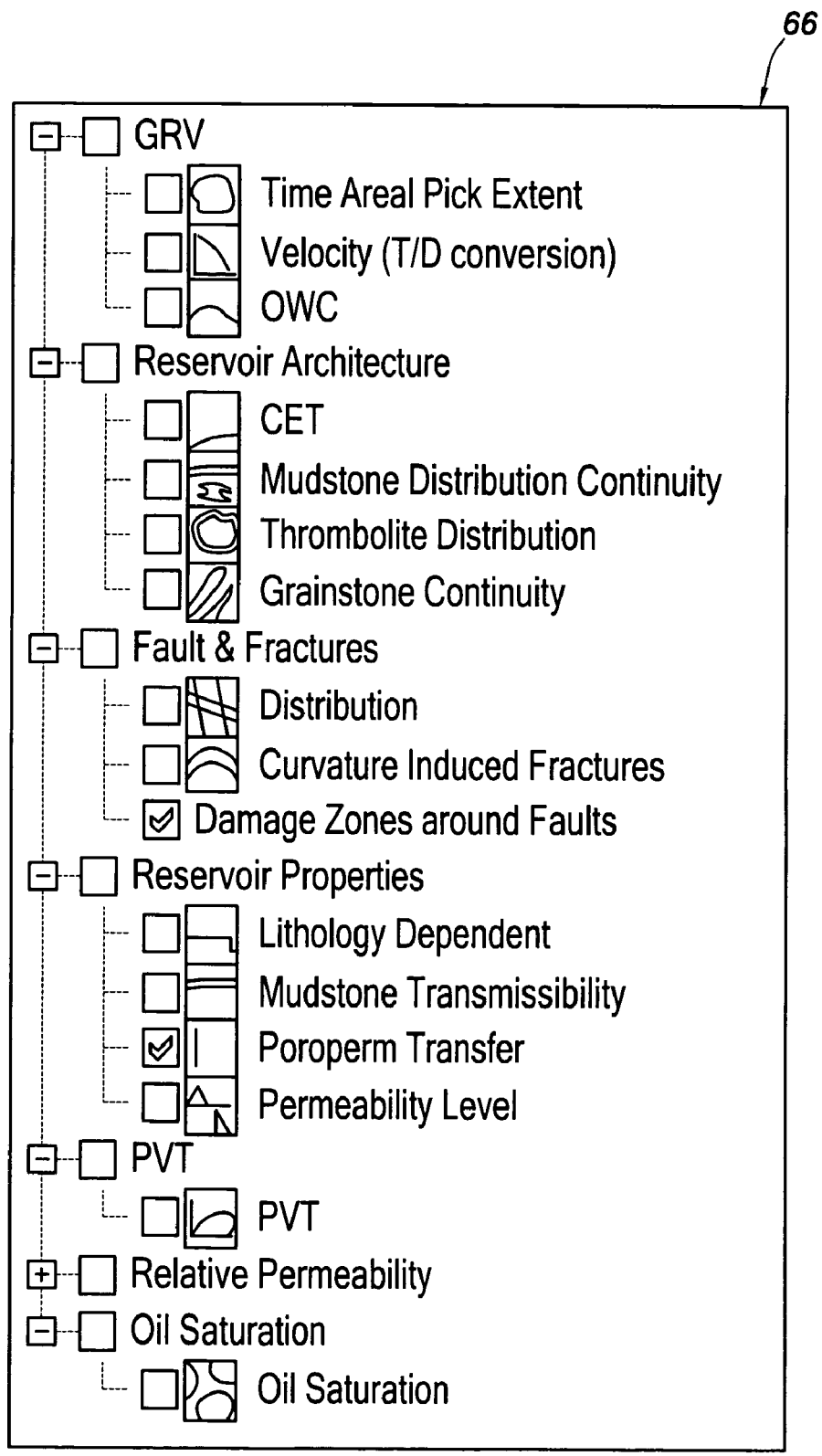
FIG. 9 illustrates an example of catalog entries for the Uncertainty Management Software.

In FIG. 3, a workstation, personal computer, or other computer system 20 is illustrated adapted for storing an 'Uncertainty Management Software'. The computer system 20 of FIG. 3 includes a Processor 20a operatively connected to a system bus 20b, a memory or other program storage device 20c operatively connected to the system bus 20b, and a recorder or display device 20d operatively connected to the system bus 20b. In addition, input data is adapted to be transmitted to the system bus 20b of the computer system 20 either via an input device 25 or a storage medium 27 that are adapted to be connected to the system bus 20b. The Uncertainty Catalog 66 of FIG. 9 provides uncertainty and risk information to the computer system 20. The memory or other program storage device 20c stores the 'Uncertainty Management Tool' software 22 (hereinafter called the 'Uncertainty Management Software' 22) that practices the 'assessment of uncertainty and risk' method or technique that is disclosed in this specification. The Uncertainty Management Tool software 22, which practices the 'assessment of uncertainty and risk' method disclosed in this specification, contains programming sufficient to perform the steps of the 'assessment of uncertainty and risk' method or process which is illustrated in FIG. 5. The 'Uncertainty Management Software' 22, which is stored in the memory 20c of FIG. 3, can be initially stored on a Hard Disk or CD-Rom 24, where the Hard Disk or CD-Rom 24 is also a 'program storage device'. The CD-Rom 24 can be inserted into the computer system 20, and the 'Uncertainty Management Software' 22 can be loaded from the Hard Disk/CD-Rom 24 and into the memory/program storage device 20c of the computer system 20 of FIG. 3. The Processor 20a will execute the 'Uncertainty Management Software' 22 that is stored in memory 20c of FIG. 3; and, responsive thereto, the Processor 20a will generate an 'output display' that is recorded or displayed on a 'Display Screen' 20d1 of the Recorder or Display device 20d of FIG. 3. The 'output display', which is recorded or displayed on the 'Display Screen' 20d1 of the Recorder or Display device 20d of FIG. 3, is illustrated in FIGS. 6, 7, 8, and 11. The 'output display' that is recorded or displayed on the 'Display Screen' 20d1 of the Recorder or Display device 20d of FIG. 3 will comprise either: (1) a 'Realization Tree', an example of which is illustrated in FIGS. 6, 8, and 11, or (2) a 'Treemap', an example of which is illustrated in FIG. 7. The 'Uncertainty Management Software' 22 will, when executed, practice the process steps illustrated in FIG. 5 in order to subsequently generate and display, on the 'Display Screen' 20d1, the 'Realization Tree' of FIGS. 6, 8, and 11 and the 'Treemap' of FIG. 7. The 'Realization Tree' of FIGS. 6, 8, and 11 and the 'Treemap' of FIG. 7 are each subsequently and jointly used in connection with the process steps associated with the 'overall Uncertainty Management System' shown in FIG. 10. The computer system 20 of FIG. 3 may be a personal computer (PC), a workstation, a microprocessor, or a mainframe. Examples of possible workstations include a Silicon Graphics Indigo 2 workstation or a Sun SPARC workstation or a Sun ULTRA workstation or a Sun BLADE workstation. The memory or program storage device 20c (including the above referenced Hard Disk or CD-Rom 24) is a 'computer readable medium' or a 'program storage device' which is readable by a machine, such as the processor 20a. The processor 20a may be, for example, a microprocessor, microcontroller, or a mainframe or workstation processor. The memory or program storage device 20c, which stores the 'Uncertainty Management Software' 22, may be, for example, a hard disk, ROM, CD-ROM, DRAM, or other RAM, flash memory, magnetic storage, optical storage, registers, or other volatile and/or non-volatile memory.

Referring to FIG. 4, recall that the 'hydrocarbon development process' of FIG. 1 can exhibit certain 'technical and workflow complexities' (illustrated in FIG. 2) and that these 'technical and workflow complexities' can be eliminated by utilizing the 'Uncertainty Management Software' 22 of FIG. 3. Consequently, in FIG. 4, when the 'hydrocarbon development process' of FIG. 1 utilizes the 'Uncertainty Management Software' 22 of FIG. 3, the 'hydrocarbon development process' of FIGS. 1 and 4 will 'define uncertainties' (step 26) and then 'invoke the Uncertainty Management Software' 22 (steps 28 and 30) that is stored in the computer system 20 and/or hard disk 24 shown in FIG. 3. For example, in FIG. 4 (which depicts the 'hydrocarbon development process' of FIG. 1), during the 'Frame project' step 12, uncertainties will be defined, step 26. During the 'capture results' step 16, the 'Uncertainty Management Software' 22 will be invoked, step 28. During the 'capture results from detailed model' step 19, the 'Uncertainty Management Software' 22 will be invoked, step 30. As a result, the aforementioned 'technical and workflow complexities' that were previously associated with the 'hydrocarbon development process' of FIG. 1 have been eliminated by utilizing the 'Uncertainty Management Software' 22 of FIG. 3. Accordingly, in FIG. 4, a 'Smart Workflow System' has been developed. In FIG. 4, since the 'Smart Workflow System' of FIG. 4 invokes and utilizes the Uncertainty Management Software 22, the Smart Workflow System of FIG. 4 is able to: (1) guide the workflows from a decision support-based perspective; (2) facilitate of the capture and storage of relevant data, decisions, rationale, and work results; (3) manage events (e.g. notifications and approvals) during the process; (4) support the project planning, resource management, progress tracking and reporting functions; and (5) integrate intellectual capital (guidelines, standards and knowledge) into the workflows. Process tracking makes project progress visible to project managers and improves team and organizational efficiency by managing the status and notifications generated during the course of the IRM process. Specifically, data notifications from the following sources are be supported: new wells, well logs, or interpreted tops are available in the project database; new seismic interpretation data available in project database; new static models are available for use in dynamic simulation; and new production histories are available.

Referring to FIG. 5, a plurality of 'Process Steps for Uncertainty Management', which are practiced by the 'Uncertainty Management Software' 22 of FIG. 3 when the 'Uncertainty Management Software' 22 is executed by the processor 20a of FIG. 3, are illustrated.

In FIG. 5, those 'Process Steps for Uncertainty Management', practiced by the 'Uncertainty Management Software' 22 of FIG. 3, are illustrated in FIG. 5. In FIG. 5, those 'Process Steps for Uncertainty Management' include: creating/updating 32 a catalog for uncertainty areas; capturing 34 quantitative and qualitative uncertainty data; establishing dependencies between uncertainties 36; associating risks to uncertainties 38; associating action plans and tasks to risks 42; creating/updating a realization tree from uncertainty ranges 40; and tracking/visualizing changes to uncertainties and realizations over time 44. The 'Process Steps for Uncertainty Management' illustrated in FIG. 5 represent a method of uncertainty management adapted for managing uncertainties and risks during the development of a reservoir, where the method includes: determining a set of uncertainties pertaining to the development of the reservoir, the set of uncertainties including qualitative information and quantitative information, the uncertainties being reduced in response to development of the reservoir; and continuously changing the qualitative information and the quantitative information associated with the set of uncertainties when the uncertainties are reduced in response to development of the reservoir. The steps 32-44 of FIG. 5, representing the step of determining a set of uncertainties pertaining to the development of the reservoir, associated with the 'Process Steps for Uncertainty Management' of FIG. 5, are more fully described below.

Refer now to FIG. 5 wherein the step of determining a set of uncertainties pertaining to the development of the reservoir, associated with the 'Process Steps for Uncertainty Management' of FIG. 5, includes the following substeps:

Creation of a Catalog for Uncertainty Areas, Step 32

In FIG. 5, through interaction with a user, a catalog of uncertainty templates is created, step 32, and stored in a database. The templates are grouped into categories defined by the user. A data model describes key attributes for the template, including, in one embodiment of the present invention for use in the E&P industry, Name, Description, Units, E&P Discipline, and Order in a Realization Tree.

Capturing Quantitative and Qualitative Uncertainty Data, Step 34

In FIG. 5, through interaction with a user, quantitative and qualitative information about uncertainties defined by the catalog are captured, in step 34, by one embodiment of the present invention. Quantitative information, in one embodiment of the present invention for use in the E&P industry, includes the distribution type (Unknown, Constant Value, Normal, Uniform, Log-Normal, User Defined) as well as the ranges associated with the chosen distribution. Qualitative information, in one embodiment of the present invention for use in the E&P industry, includes the reason for uncertainty, such as data availability, data quality, data relevance. Qualitative data may also include images (jpeg, gif, etc.), voice narration or other unstructured data which are then associated to the uncertainty. All captured qualitative and quantitative data are stored to a database. (FIG. 9 depicts an example of catalog entries in accordance with one embodiment of the present invention).

Establishing Dependencies between Uncertainties, Step 36

In FIG. 5, as uncertainties are entered into the system, or at any time after the fact, the system provides a mechanism to establish dependencies, in step 36, between one or more uncertainties. It should be noted that this step is optional, as no dependencies may exist between any uncertainties. Dependency information is utilized when adding uncertainties to the Realization Tree (see FIGS. 6, 8, and 11 for examples of a Realization Tree).

Associating Risks to Uncertainties, Step 38

In FIG. 5, through interactions with the user, risk information can preferably be associated to each uncertainty, step 38 in FIG. 5. Multiple risks or opportunities may exist for each uncertainty. Information for each risk may include a Name, Description, Severity, Impact, and Likelihood. Contextual information may also be associated with each risk, including images jpeg, gif, etc.) and voice narration.

Associating Action Plans and Tasks to Risks, Step 42

In FIG. 5, through interactions with the user, risk mitigation action plans and tasks may preferably be associated to each risk, step 42 in FIG. 5. Multiple action plans and tasks may exist for each risk or opportunity. Information for each action plan may include Name, Description and Status. Information for each task may include Name, Description, Status, Assigned To, Start Date and Finish Date.

Creating a Realization Tree from Uncertainty Ranges, Step 40

In FIG. 5, from the captured realization quantitative information and attributes in the uncertainty catalog, a Realization Tree is preferably created through visual interaction by the user, step 40 in FIG. 5. During construction of the tree, the distribution type and ranges are honored for each uncertainty. For example, an uncertainty with a constant value will yield one realization in the tree. An uncertainty with three user-defined values (high case, median case, and low case) will yield three (3) realizations. The hierarchical nature of the Realization Tree means that there is a multiplicative effect on the total number of realizations as each uncertainty is added. A simplified Realization Tree in accordance with one embodiment of the present invention is illustrated in FIGS. 6, 8, and 11. As uncertainties are added to the Realization Tree, the Uncertainty Management Software 22 checks for any dependencies that may have been established. If a dependency exists, the Uncertainty Management Software 22 identifies the dependencies and provides guidance on adding the related uncertainties to the tree.

Tracking Changes to Uncertainties and Realizations Over Time, Step 44

In FIG. 5, changes are tracked over time, step 44 in FIG. 5. As an oil and gas reservoir is being developed, new data is acquired, analysis is being performed, and uncertainty and risks are being reduced. Through user interaction, the Uncertainty Management Software 22 incorporates changes to the quantitative and qualitative information associated with an uncertainty, provides for "snapshots" of the database to be taken at selected milestones, allows visualization of changes to uncertainty and risk across these snapshots, and captures the decision context as changes are made to branches and nodes in the Realization Tree over time. FIG. 7, which illustrates a 'Treemap', illustrates a visualization of changes to uncertainties at certain Key Milestones in accordance with one embodiment of the present invention. FIG. 8 illustrates a Realization Tree with 'Pruned Realizations' in accordance with one embodiment of the present invention. Another challenge faced by asset teams pertains to understanding the potentially large numbers of realizations required in order to address the full range of uncertainty. This can be a laborious and time-consuming process. As such, it was important that the Uncertainty Management Software 22 is capable of populating and managing Realization Trees in order that the Realization Trees will then illustrate a full range of realizations. The Uncertainty Management Software 22 interactively creates and edits a Realization Tree (such as the Realization Tree illustrated in FIGS. 6, 8, and 11) using the uncertainty information (e.g., the ranges) collected by the Uncertainty Management Software 22. In addition, the Uncertainty Management Software 22 also has the ability to generate a 'realization matrix' from the Realization Tree. This 'realization matrix' represents and includes 'individual realizations' and their parameters that must be generated in order to capture the range of uncertainty. The most likely, or reference, case is defined within the matrix to which other realizations are compared in order to determine sensitivities within the reservoir. The "final" realization matrix, consisting of P10/P90 or similar cases, is then paired with development scenarios encompassing topside facilities and other development factors. Uncertainty information will change during the evolution of a project as more data becomes available and uncertainties become better understood (e.g., reduced). As users make changes using the Uncertainty Management Software 22, that Software 22 will keep an 'audit trail' of the changes and provide the ability to generate reports representing the audit trail content. Collectively, the information stored in the database provides an audit trail on the reduction of uncertainty and can be interrogated at future dates for the purposes of: (1) making the best decision based on current understanding of uncertainty; (2) establishing best practices on uncertainty handling; (3) serving as a knowledge base for uncertainty about reservoir; or (4) establishing an audit trail for Sarbanes-Oaxley compliance.

A dashboard view on uncertainties and risks can provide real-time feedback on the current state. A dashboard view incorporating graphical depictions, such as the 'TreeMap' illustrated in FIG. 7, is provided as one output generated by the Uncertainty Management Software 22 of FIG. 3 as an effective means for providing transparency. When combined with system snapshots and animation, it is possible to see how uncertainty and risk has evolved during the course of a project.

Referring to FIG. 5A, the 'Display Screen' 20d1 of the Recorder or Display device 20d of the computer system 20 of FIG. 3 is illustrated. In FIGS. 3 and 5A, the processor 20a of FIG. 3 of the computer system 20 will execute the Uncertainty Management Tool software 22 stored in the memory or program storage device 20c of the computer system 20 while, simultaneously, using the input data (from the input device 25 or stored in the storage medium 27) during that execution. When the processor 20a completes the execution of the Uncertainty Management Tool software 22 stored in the memory or program storage device 20c (while using the aforesaid input data), a set of 'output data' is transmitted to the Recorder or Display device 20d ; and, in response to that 'output data', the Recorder or Display device 20d will record or display, on the Display Screen 20d1, a plurality of 'visualizations of uncertainty'. In FIG. 5A, the aforementioned 'visualizations of uncertainty', which are being displayed on the Display Screen 20d1 of the Recorder or Display device 20d, will include either a Realization Tree 46 or a Treemap 48 or both the Realization Tree 46 and the Treemap 48. Alternatively, the Realization Tree 46 and the Treemap 48 'visualizations of uncertainty' can also be printed on a printer wherein printouts are generated by the computer system 20, the printouts including or displaying the Realization Tree 46 and/or the Treemap 48.

The Uncertainty Management Tool (UMT) software 22 of FIGS. 3 and 5 may be used with the Smart WorkFlow System (SWS) of FIG. 4 and a Smart Collaborative Environment (SCE), all applied in the context of new collaborative work practices. The combination of UMT, SWS and SCE forms an integrated solution which enables an asset team to optimize its expenditure of scarce resources on the right reservoir scenarios and most relevant sources of risk, such as reservoir continuity or channel sand/shale geometries, all driven by group consensus. The environment improves execution of the reservoir management processes through establishment of a common real-time team view. This common real-time team view increases transparency of technical work, allows for real-time updates on progression of the risk mitigation plan, and allows for playback and critique of decisions in the context of an evolving shared earth framework. Rework is minimized, the efficiency and effectiveness of technical and business reviews are improved, and best practices are captured for global re-use. Integrated models of reservoir systems are detailed numerical representations that have been developed by systematic linkage of the interpretations made by various geoscience and engineering disciplines. These models routinely begin with a comprehensive static reservoir description that is further enhanced by fine-tuning the property distribution so as to calibrate the model performance to the reported historical pressure, production and saturation data. Such models are generally constructed to evaluate development plans by forecasting production (both rate & composition), pressure, and saturation responses of reservoirs under various operational plans. The real value of integration in reservoir geoscience and engineering lies in the ability to optimize this coupling between the static and dynamic components at both the appraisal and the development stages. The result of such a workflow is: a reservoir model that has incorporated all known geological constraints and uncertainties, a dynamic model which can accurately predict reservoir performance and provide reliable reserve estimates, and high quality technical inputs for a more informed and discriminate commercial decision-making process. Good data management is a necessary foundational requirement upon which the abovementioned solutions are built. Data management enhancements useful for implementing the current invention include the construction of a common and consistent data architecture with an associated set of technical workflows for accessing and managing the data and the creation of a document store for unstructured data associated with the project work. A standard corporate data architecture and project data store with role-based access tools may be used consistently across projects within an organization and a standard data quality workflow approach would support consistency. Official project data may be archived in the standard project data store and access to shared data is made easy through a desktop web interface. Tools to enact integrated reservoir modeling workflows are often application specific and so shortfalls typically exist. Examples of these shortfalls are non-transparent project tracking, poor audit trail of the decision rationale associated with the hydrocarbon development or integrated reservoir management process, and lack of prompting of workflow guidance and best practices from within the application suite.

Referring to FIG. 6, one example of a simplified Realization Tree 46 of FIG. 5A is illustrated.

In FIG. 6, the Realization Tree 46 includes a plurality of levels 46a, 46b, 46c, 46d, and 46e, each level representing a level of uncertainty. For example, for the uncertainty present in level 46b of the Realization Tree 46 of FIG. 6, either 'channel system' 50 or 'lobate sands' are useful in a modeling exercise. In addition, the Realization Tree 46 of FIG. 6 includes a plurality of 'realizations'. For example, in FIG. 6, one such 'realization' would comprise the following: 'channel system' 50, 'continuous' 54, 'no shale' 56, and '35%' 58. SPE 84439 entitled "Using Visualization Tools to Gain Insight into Your Data', dated Oct. 5, 2003, is incorporated by reference into the specification of this application.

Referring to FIG. 7, one example of a simplified 'Treemap' 48 of FIG. 5A is illustrated. The Treemap 48 of FIG. 7 allows a user to visualize changes to uncertainties at certain key milestones over time.

In FIG. 7, the simplified 'Treemap' 48 of FIG. 7 has a Time (t) axis 60 as shown. Therefore, a first section 48a of the 'Treemap' 48 exists at time 't1', a second section 48b of the 'Treemap' 48 exists at time 't2', and a third section 48c of the 'Treemap' 48 exists at time 't3'. In addition, each section 48a, 48b, 48c of the 'Treemap' includes one or more 'boxes'. For example, in the first section 48a, a plurality of boxes 62 exist within the first section 48a. Each box 62 associated with each section 48a, 48b, 48c of the Treemap represents a different uncertainty. In addition, each box 62 has a 'box size' and a 'box color' (color not shown). The larger the 'box size', the higher the impact or the severity or the risk of the particular uncertainty associated with that box. On the other hand, the smaller the 'box size', the smaller the impact or the severity or the risk of the particular uncertainty associated with that box. In addition, if a particular box 62 has a color of 'red', the uncertainty associated with that particular box has not been approved, and a technical review of that uncertainty associated with that particular box is needed. On the other hand, if a particular box 62 has a color of 'green', the uncertainty associated with that particular box has been approved, and a technical review of that uncertainty associated with that particular box is not needed. In operation, in FIG. 7, by way of example, the first section 48a of the Treemap 48 exists at time (t1), and the first section 48a of the Treemap 48 includes a plurality of boxes 62, where each box 62 represents a different uncertainty and each box has its own 'box size' and 'box color'. If the 'box size' is large, the risk associated with the uncertainty in that box is large, and, if the 'box size' is small, the risk associated with the uncertainty in that box is small. The larger the 'box', the higher the risk associated with the uncertainty in that 'box', and, the smaller the 'box', the smaller the risk associated with the uncertainty in that 'box. If the 'box color' is red, the risk associated with the uncertainty in that box has not been approved by management, and a technical review of the risk associated with that uncertainty is needed. If the 'box color' is green, the risk associated with the uncertainty in that box has been approved by management and a technical review of the risk associated with that uncertainty is not needed. SPE 84439 entitled "Using Visualization Tools to Gain Insight into Your Data', dated Oct. 5, 2003, is incorporated by reference into the specification of this application.

Referring to FIG. 8, an example of the simplified Realization Tree 46 of FIG. 6 having 'pruned realizations' is illustrated.

In FIG. 8, the Realization Tree 46 of FIG. 6 is illustrated once again; however, in FIG. 8, the Realization Tree 46 has 'pruned realizations'. In FIG. 8, a portion 64 of the Realization Tree 46 has been 'removed' or 'pruned' because 'seismic inversion analysis does not support this scenario'. Thus, in FIG. 8, the right-hand portion 64 of the Realization Tree 46 has been 'removed' or 'pruned' from the Realization Tree 46.

Figure 10:
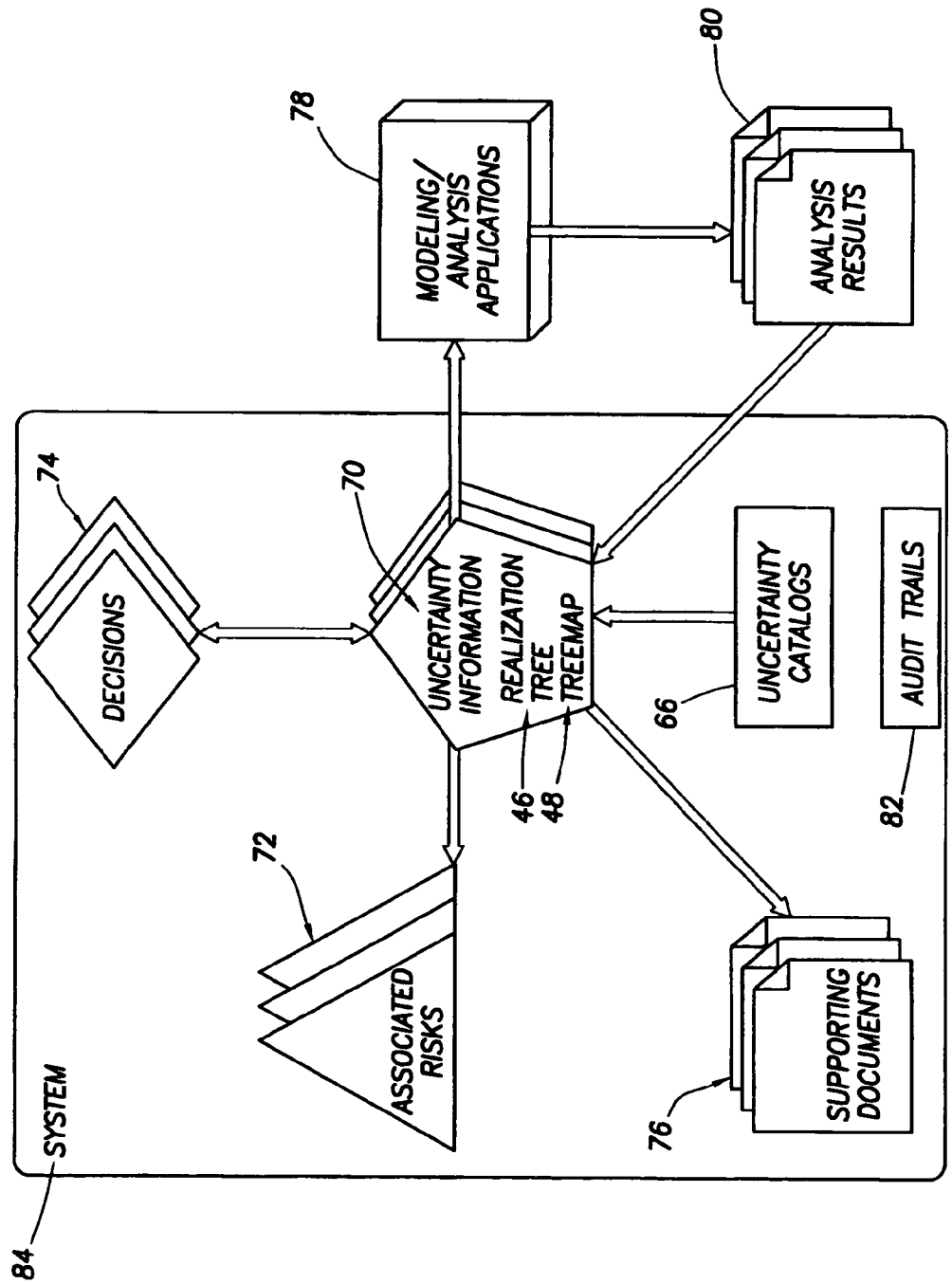
FIG. 10 illustrates an overall Uncertainty Management System which utilizes the uncertainty and risk information that is displayed in the Realization Tree of FIGS. 6 and 8 and the Treemap of FIG. 7.
Figure 11A:
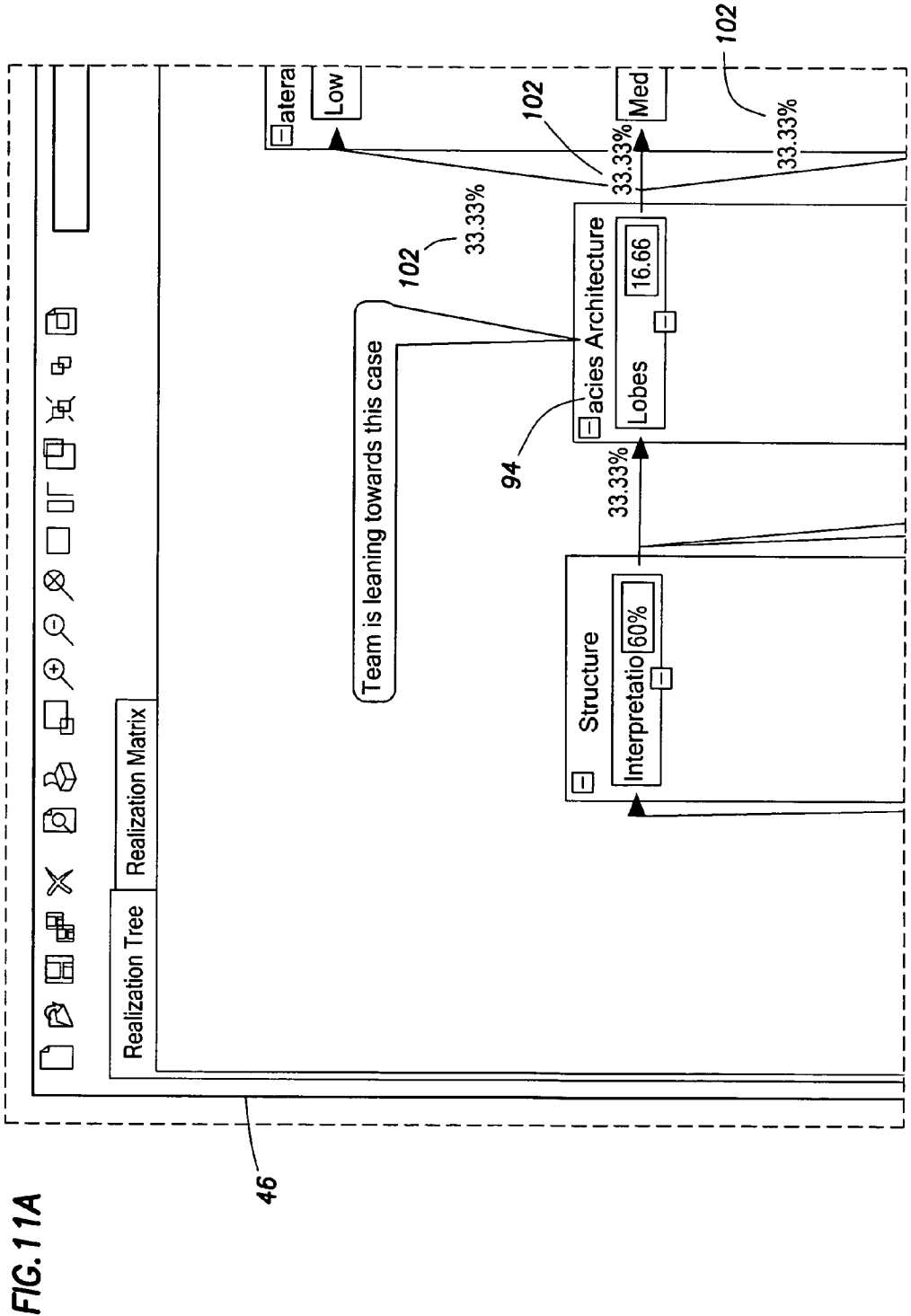
FIGS. 11A, 11B, 11C, and 11D, illustrates a more detailed construction and example of the Realization Tree of FIGS. 6 and 8.
Figure 11B:
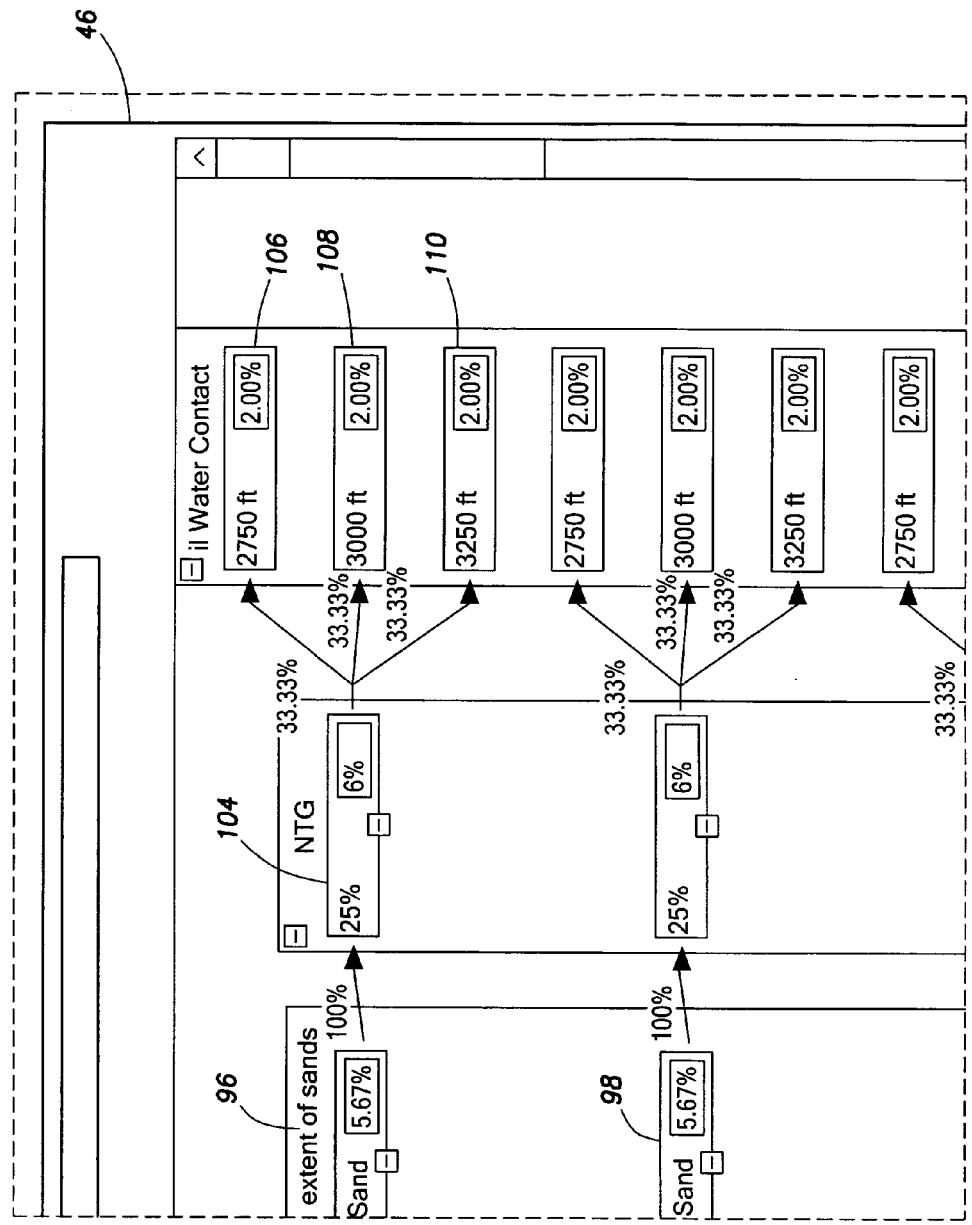
Figure 11C:
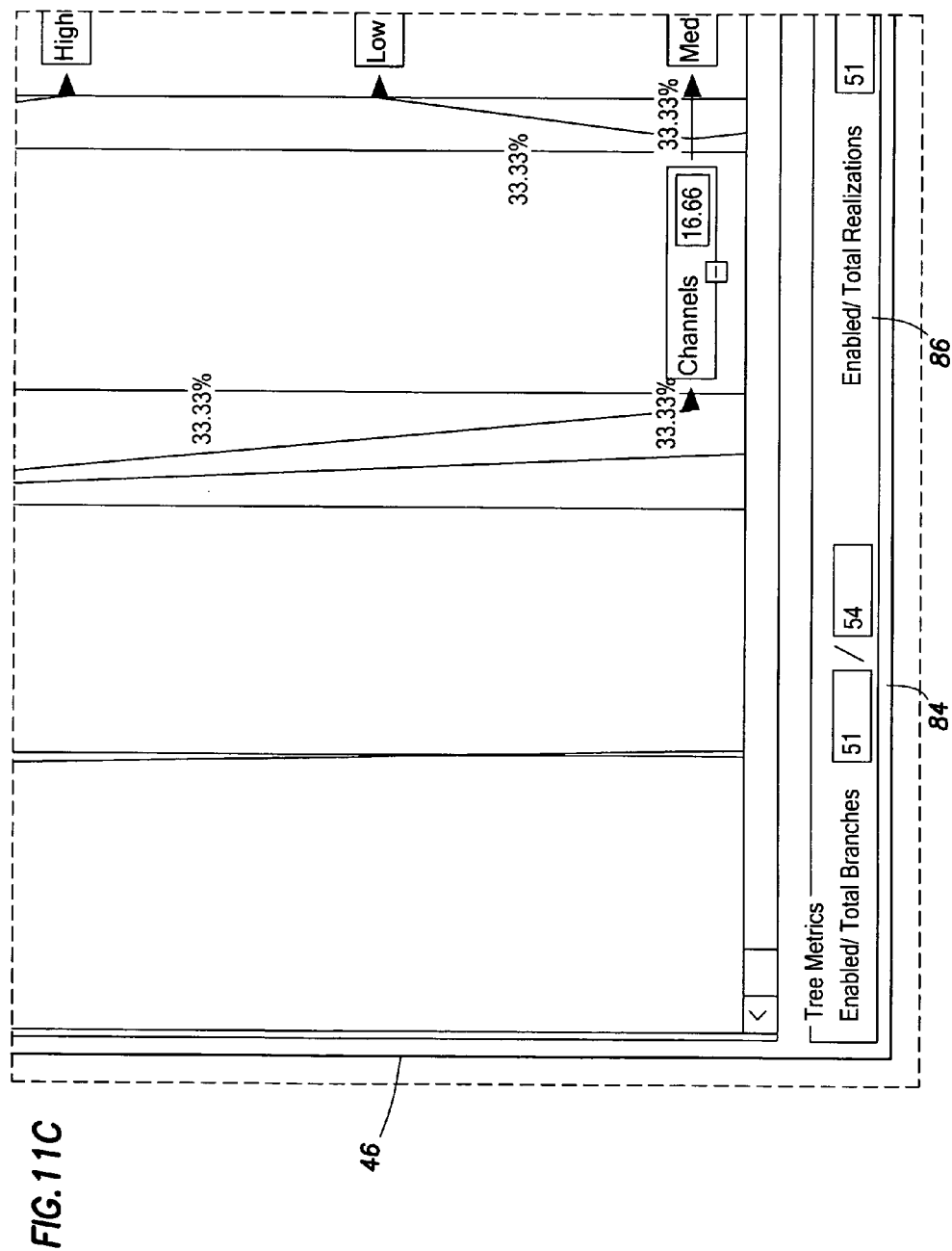
Figure 11D:
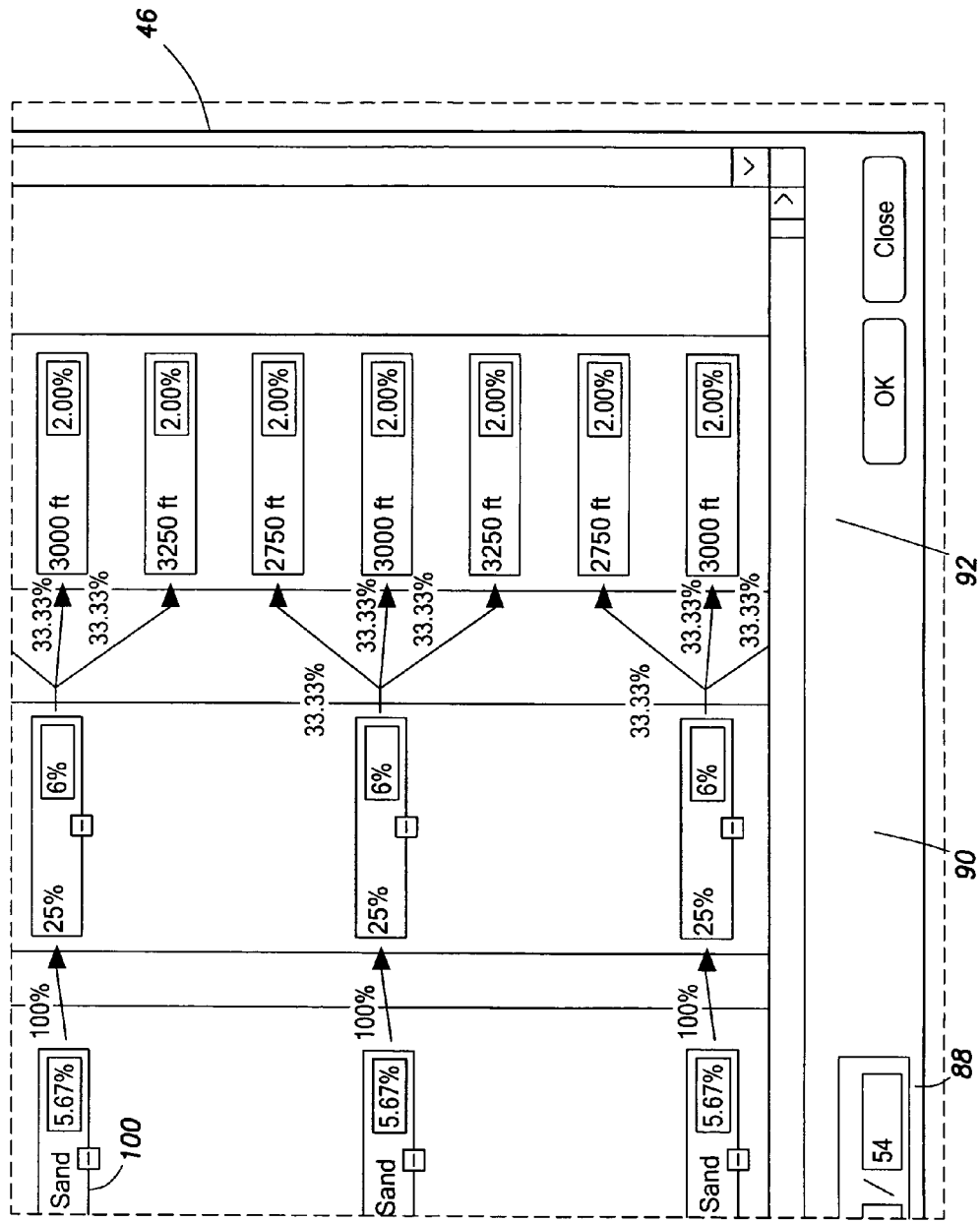

Referring to FIG. 9, an example of an uncertainty catalog 66 is illustrated. FIG. 9 illustrates an example of catalog entries in the uncertainty catalog 66 for use by the Uncertainty Management Tool (UMT) software 22 of FIG. 3. In FIG. 5, recall that step 32 was entitled 'create/update uncertainty catalog'. In FIG. 5, through interaction with a user, a catalog of uncertainty templates is created, step 32, and stored in a database. The templates are grouped into categories defined by the user. A data model describes key attributes for the template, including, in one embodiment of the present invention for use in the E&P industry, Name, Description, Units, E&P Discipline, and Order in a Realization Tree. One example of the 'uncertainty catalog' referenced in step 32 of FIG. 5 is the 'uncertainty catalog' 66 shown in FIG. 9. The uncertainty catalog 66 of FIG. 9 contains uncertainty information; and the uncertainty information stored in the uncertainty catalog 66 of FIG. 9 is provided as input data to the Uncertainty Management software 22 of FIG. 3, as illustrated in FIG. 10. In response thereto, the Uncertainty Management software 22 uses the uncertainty information stored in the uncertainty catalog 66 of FIG. 9 to thereby generate the Realization Tree 46 and the Treemap 48 of FIG. 5A.

Referring to FIG. 10, an overall Uncertainty Management System is illustrated. The overall Uncertainty Management System of FIG. 10 comprises the computer system 20 of FIG. 3 including processor 20a and memory 20c which stores the Uncertainty Management Software 22. Together, the processor 20a and the Uncertainty Management Software 22, which comprises the 'System' 84, responds to the Uncertainty Catalogs 66 by generating Uncertainty Information 70, the Uncertainty Information 70 further generating Associated Risks 72, supporting documents 76, and decisions 74. The 'Uncertainty Information' 70 is used by modeling/analysis applications 78 adapted for generating 'analysis results' 80, the 'analysis results' 80 being fed back to the Realization Tree 46 and Treemap 48 for generating more Uncertainty Information 70. In particular, in FIG. 10, the uncertainty information set forth in the uncertainty catalog 66 of FIG. 9 is used by the Uncertainty Management software 22 stored in the computer system 20 of FIG. 3 to generate 'Uncertainty Information' 70 which is recorded in a Realization Tree 46 and/or a Treemap 48, as illustrated in FIG. 5A. Thus, the Realization Tree 46 and the Treemap 48 each record the 'Uncertainty Information' 70 illustrated in FIG. 10. In FIG. 10, the 'Uncertainty Information' 70 is used to generate 'associated risks' 72. In addition, a set of 'Decisions' 74 are made in response to the 'Uncertainty Information' 70. The 'Uncertainty Information' 70 is also recorded in 'supporting documents' 76. The 'Uncertainty Information' 70 is transmitted to 'modeling/analysis applications' 78, the 'modeling/analysis applications' 78 using the 'Uncertainty Information' 70 to generate 'analysis results' 80. The 'analysis results' 80 are transmitted back to the Realization Tree 46 and the Treemap 48 to thereby generate 'additional Uncertainty Information' 70. The above process illustrated in FIG. 10 provides an 'audit trail' 82 for use by management.

Referring to FIG. 11, including FIGS. 11A, 11B, 11C, and 11D, a more detailed example of the Realization Tree 46 of FIGS. 5A, 6, and 8 is illustrated. In FIG. 11, including FIGS. 11A, 11B, 11C, and 11D, recall that the Realization Tree 46 includes a plurality of levels 84, 86, 88, 90, and 92, each level 84-92 having a 'defined uncertainty'. In level 86, the noted uncertainty is 'Facies Architecture' 94. The 'Facies Architecture' uncertainty 94 would include three different uncertainties in level 88: low sand 96, medium sand 98, and high sand 100. Each of the uncertainties 96, 98, 100 have a 33.33% probability, as denoted by numeral 102. The low sand 96 uncertainty would have a 25% Net to Gross (NTG) 104 in level 90, and the 25% Net to Gross (NTG) 104 in level 90 would have three different uncertainties in level 92: 2750 feet Water Contact 106; 3000 feet Water Contact 108; and 3200 feet Water Contact 110. In FIG. 11, one 'realization' would include the following uncertainties: Facies Architecture 94, low sand 96, 25% Net to Gross 104, and 2750 feet Water Contact 106.

Figure 12:
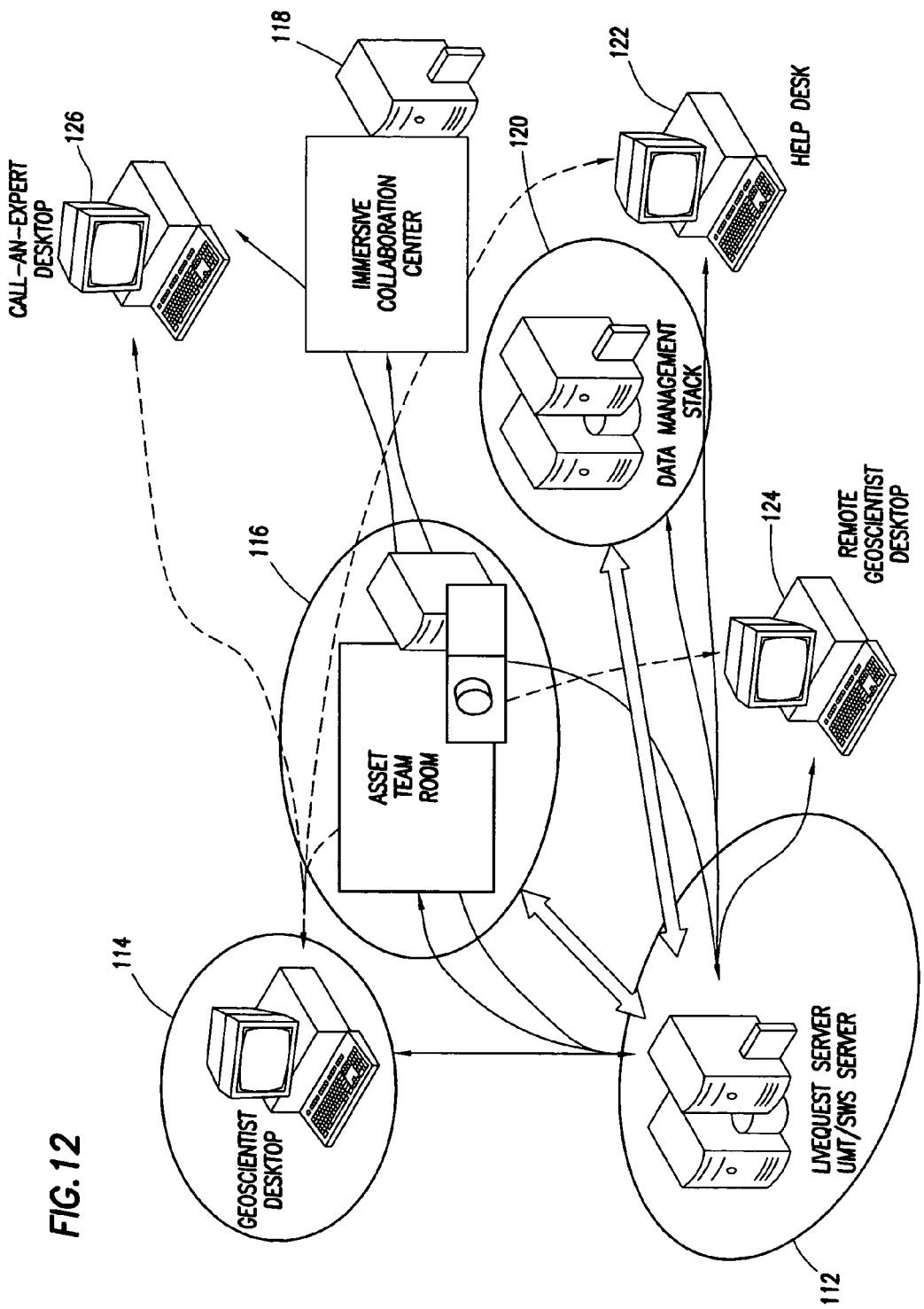
FIG. 12 illustrates a system known as a 'Smart Collaborative Environment', the Uncertainty Management Software that is stored in the computer system of FIG. 3 being physically located in the 'Livequest Server' portion of the 'Smart Collaborative Environment' of FIG. 12.

Referring to FIG. 12, a system known as a 'Smart Collaborative Environment' is illustrated, the Uncertainty Management Software 22 that is stored in the computer system of FIG. 3 being physically located in the 'Livequest Server' portion of the 'Smart Collaborative Environment' of FIG. 12. In FIG. 12, the LiveQuest server 112 would store the Uncertainty Management Software 22. The Uncertainty Management Software 22 would be accessable to a geoscientist desktop 114, an asset team room 116, an immersive collaborative center 118, a data management stack 120, a help desk 122, a remote geoscientist desktop 124, and a call-an-expert desktop 126.

Figure 13:
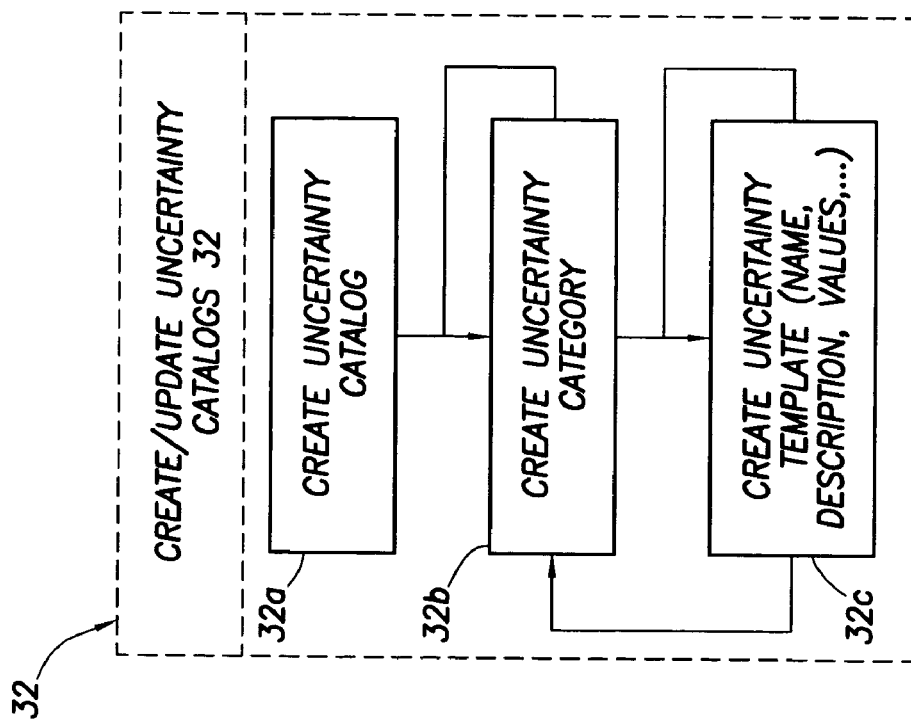

Referring to FIG. 13, a more detailed construction of the 'create/update uncertainty catalog' step 32 of FIG. 5 is illustrated. In FIG. 13, the 'create/update uncertainty catalog' step 32 of FIG. 5 includes the following steps: (1) 'create uncertainty catalog' step 32a, (2) 'create uncertainty category' step 32b, and (3) create uncertainty template (name, description, values, . . . ), step 32c. In view of the feedback loop from step 32c to step 32b, the 'uncertainty template' is used in the 'create uncertainty category' step 32b. In FIG. 13, when creating or updating uncertainty catalogs (step 32), is necessary to: create the uncertainty catalog (step 32a), then create an uncertainty category (step 32b), and then create an uncertainty template, comprising a name, description, values, etc, (step 32c).

Figure 14:
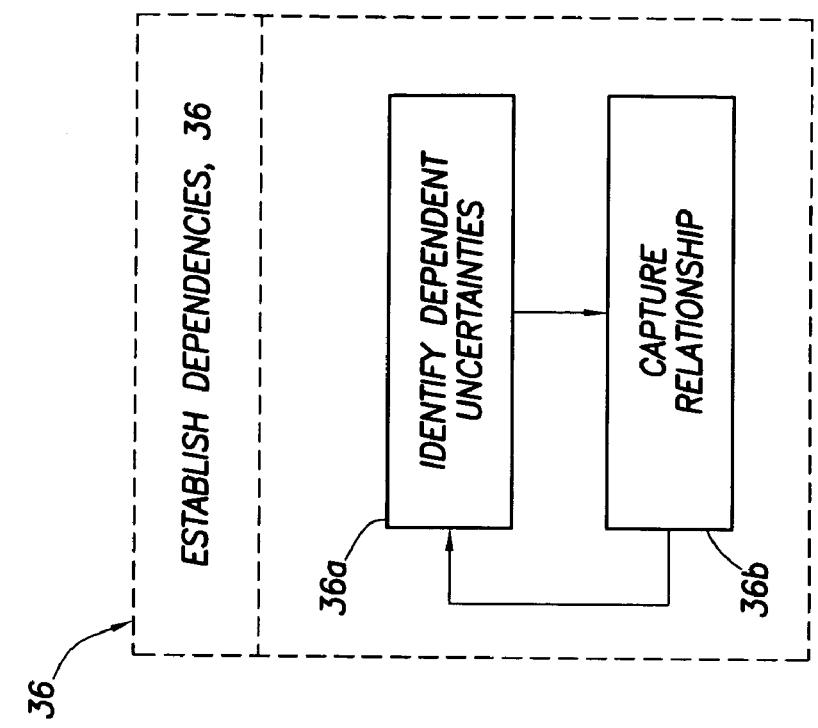
FIGS. 13, 14, 15, 16, and 17 illustrate, respectively, a detailed construction of the 'create/update uncertainty catalogs' step 32, the 'establish dependencies' step 36, the 'create/update realization tree' step 40, the 'capture/associate action plans and tasks' step 42, and the 'track/visualize changes' step 44.

Referring to FIG. 14, a more detailed construction of the 'establish dependencies' step 36 of FIG. 5 is illustrated. In FIG. 14, the 'establish dependencies' step 36 of FIG. 5 includes the following steps: (1) 'identify dependent uncertainties' step 36a, and (2) 'capture relationship' step 36b. In view of the feedback loop from step 36b to step 36a, the 'relationship' is used in the 'identify dependent uncertainties' step 36a. In FIG. 14, when establishing dependencies (step 36), it is necessary to identify dependent uncertainties which depend on 'parent uncertainties' (step 36a), and then it is necessary to capture the 'relationship' between the dependent uncertainties and each of their 'parent uncertainties' (step 36b).

Figure 15:
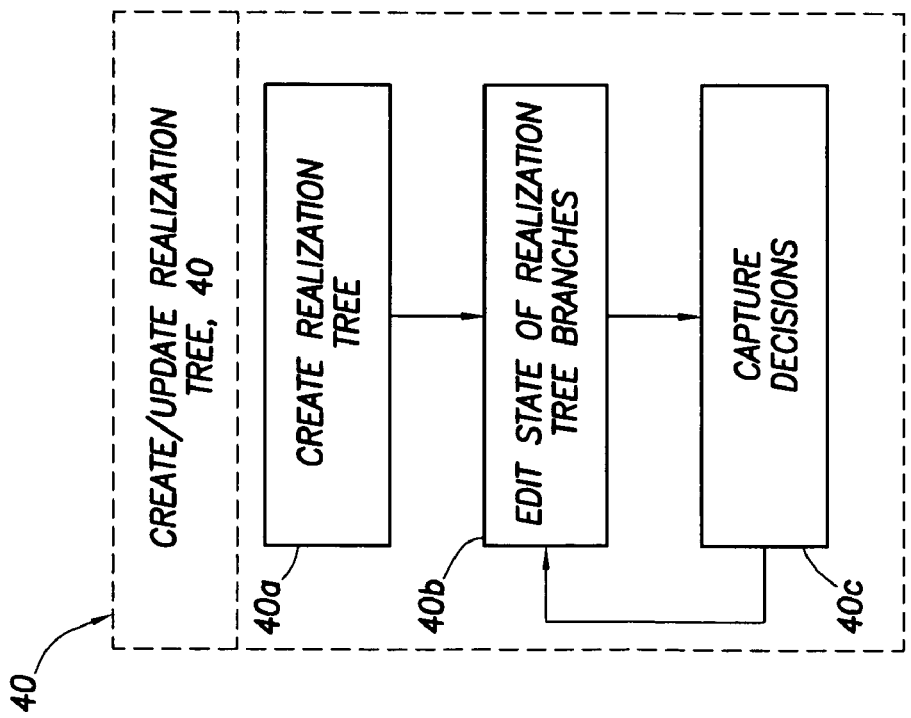

Referring to FIG. 15, a more detailed construction of the 'create/update realization tree' step 40 of FIG. 5 is illustrated. In FIG. 15, the 'create/update realization tree' step 40 of FIG. 5 includes the following steps: (1) 'create realization tree' step 40a, (2) 'edit state of realization tree branches' step 40b, and (3) 'capture decisions' step 40c. In view of the feedback loop from step 40c to step 40b, the 'decisions' are used in the 'edit state of realization tree branches' step 40b. In FIG. 15, when creating or updating a realization tree (step 40), it necessary to: create the realization tree (step 40a), and then edit the state of the realization tree branches (step 40b), and then capture any decisions which result from the editing of the state of the realization tree branches (step 40c). When the decisions are captured in step 40c, it may be necessary to go back to step 40b and re-edit the state of the realization tree branches (step 40b).

Figure 16:
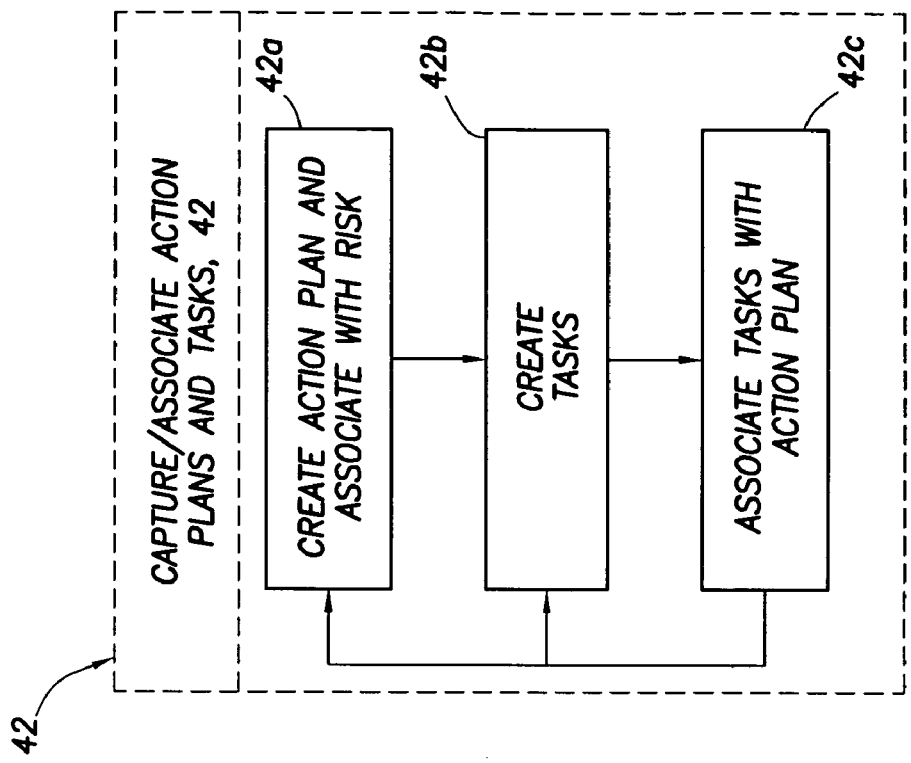

Referring to FIG. 16, a more detailed construction of the 'capture/associate action plans and tasks' step 42 of FIG. 5 is illustrated. In FIG. 16, the 'capture/associate action plans and tasks' step 42 of FIG. 5 includes the following steps: (1) 'create action plan and associate with risk' step 42a, (2) 'create tasks' step 42b, and (3) 'associate tasks with action plan' step 42c. In view of the feedback loop from step 42c to steps 42a and 42b, the 'associated tasks with action plans' generated during step 42c are used in the 'create action plan and associate with risk' step 42a and the 'create tasks' step 42b. In FIG. 16, when capturing/associating action plans and tasks (step 42), it is necessary to: create an action plan and associate a risk with the action plan (step 42a), then to create the tasks (step 42b), and then to associate the tasks with the action plan (step 42c).

Figure 17:
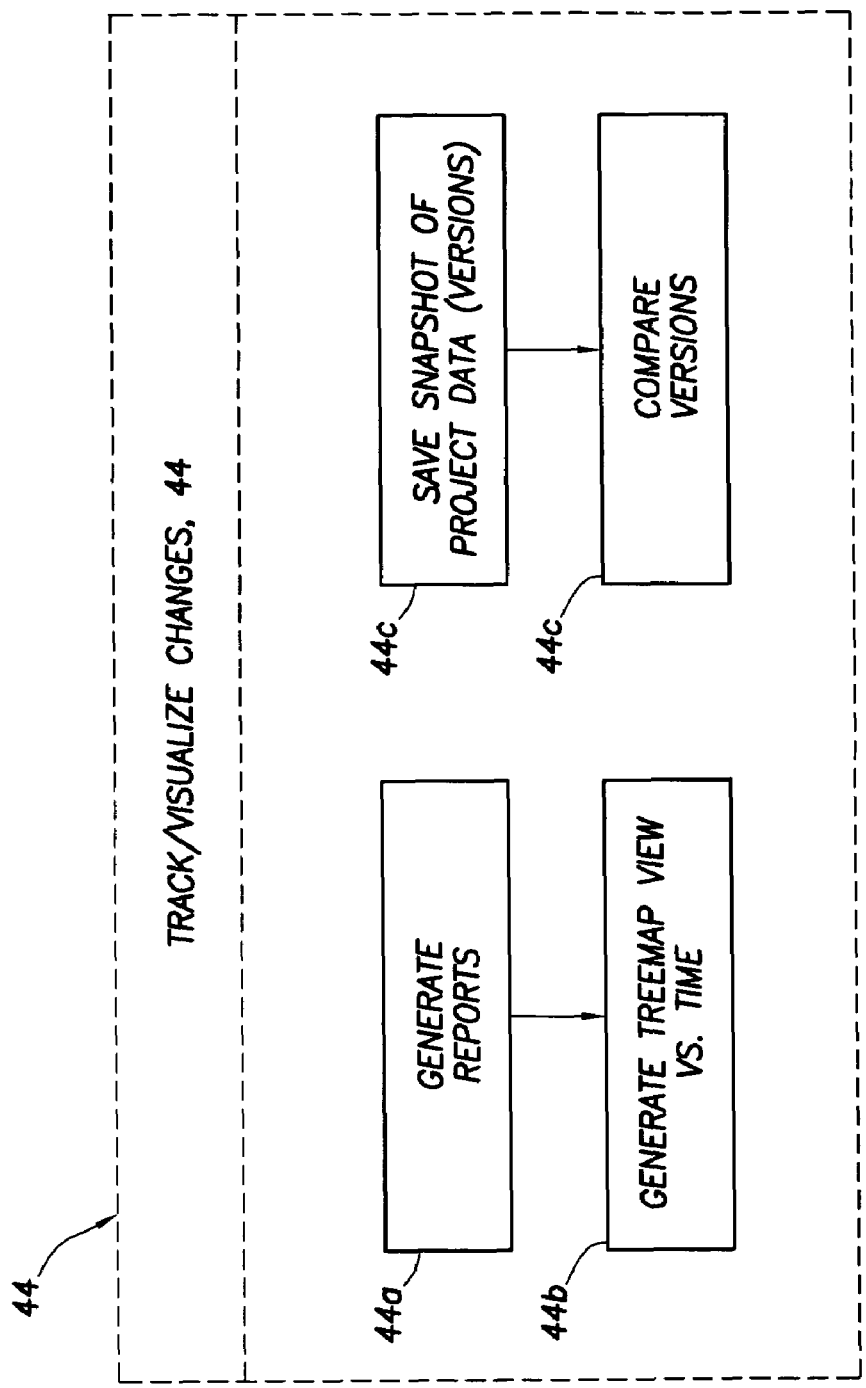

Referring to FIG. 17, a more detailed construction of the 'track/visualize changes' step 44 of FIG. 5 is illustrated. In FIG. 17, the 'track/visualize changes' step 44 of FIG. 5 includes the following steps: (1) 'generate reports' step 44a, and (2) 'generate Treemap View vs. time' step 44b. An example of a 'treemap' can be seen in FIG. 7 of the drawings. In FIG. 17, the 'track/visualize changes' step 44 of FIG. 5 also includes the following additional steps: (3) 'save a snapshot of project data (called "versions")', step 44c, and (4) 'compare the versions', step 44d. In FIG. 17, when tracking/visualizing changes 44, it may be necessary to: generate reports (step 44a), and then generate a Treemap View versus Time (step 44b). An example of the Treemap View versus Time can be seen in FIG. 7 of the drawings. In addition, in FIG. 17, when tracking/visualizing changes 44, it may be necessary to: save a snapshot of various versions of project data (step 44c), and then compare the various versions of the saved snapshots of the project data (step 44c).

A functional description of the overall Uncertainty Management System of FIG. 10, which includes a functional description of the operation of the Uncertainty Management Tool (UMT) Software 22 of FIG. 3 when that Software 22 is executed by the processor 20a of the computer system 20 of FIG. 3, will be set forth in the following paragraphs with reference to FIGS. 1 through 17 of the drawings.

The Uncertainty Management (UM) Software 22 of FIG. 3 is capable of recording both the qualitative and quantitative assessments of uncertainty and risk during the development of an oil and/or gas reservoir, and then visualizing and analyzing how these uncertainties evolve over time. This Uncertainty Management Software 22 will formally review the risk evolution of hydrocarbon projects over the life of the asset. Such a review helps not only to balance risk across a company's oil and gas portfolio, but also to design acquisition programs geared towards reducing the financial risk while improving reserves knowledge.

In particular, when the Processor 20a of the Computer System 20 of FIG. 3 executes the Uncertainty Management Software 22, quantitative and qualitative 'measures of technical uncertainty' (achieved through a variety of media) can be entered and recorded by members of an asset team associated with a variety of sub-surface technical domains. These 'measures of technical uncertainty' can be combined to assess and measure the overall reservoir risk by designing various scenarios that can then be quantitatively evaluated in a Reservoir Modeling Tool. Furthermore, the Uncertainty Management Software 22, when executed by the Processor 20a of FIG. 3, provides a way of viewing how both of these uncertainties combine at a particular point in time and how they evolve over time as new data or new insight is acquired. Therefore, the Uncertainty Management Software 22 also serves as a management review tool for better tracking the decisions leading to the valuation of reserves and/or to justify the need for further investment in a reservoir.

In FIG. 5, the following steps are practiced by the Uncertainty Management Software 22 when the Uncertainty Management Software 22 is executed by the Processor 20a of FIG. 5. The user will use the computer system of FIG. 3 to personally interact with the Uncertainty Management Software 22 of FIG. 3, when the Software 22 is executed by the Processor 20a of FIG. 3, by creating a 'catalog of uncertainty templates' and storing the 'catalog of uncertainty templates' in a 'database' which is represented by the memory 20c of the computer system 20 of FIG. 3 (see step 32 of FIG. 5). In particular, in FIG. 13, when creating/updating uncertainty catalogs (step 32), the uncertainty catalog is created (step 32a), an uncertainty category is created (step 32b), and an uncertainty template is created (step 32c). As a result of the above referenced interaction by the user with the Uncertainty Management Software 22, both 'quantitative information' and 'qualitative information' pertaining to the 'uncertainties', that are defined by the above referenced 'catalog of uncertainty templates' (66 of FIG. 9), are determined and stored in the 'database' represented by memory 20c. Recall that quantitative information includes distribution type as well as the ranges associated with the chosen distribution; and qualitative information or data may include reasons for uncertainty, or images, voice narration or other unstructured data (see step 34 of FIG. 5). When uncertainties are entered into the computer system 20 of FIG. 3, or at any time thereafter, dependencies are or can be established between one or more uncertainties (see step 36 of FIG. 5). In particular, in FIG. 14, when establishing dependencies (step 36), the dependent uncertainties are identified (step 36a), and relationships are captured (step 36b). As a result of the above referenced interaction by the user with the Uncertainty Management Software 22, a 'set of risk information', including a plurality of 'risks', and 'contextual information' can be associated with each uncertainty that was entered into and stored within the computer system 20 of FIG. 3 (see step 38 of FIG. 5). As a result of the above referenced interaction by the user with the Uncertainty Management Software 22, a set of 'risk mitigation action plans' and associated 'tasks' can be optionally associated with each 'risk' of the above referenced 'set of risk information'. Recall that multiple action plans and tasks may exist for each 'risk' or 'opportunity' (see step 42 of FIG. 5). In particular, in FIG. 16, when capturing/associating action plans and tasks (step 42), an action plan is created and is associated with risk (step 42a), tasks are created (step 42b), and tasks are associated with an action plan (step 42c). As a result of the above referenced interaction by the user with the Uncertainty Management Software 22, in response to (and as a result of) the 'quantitative information' and other attributes pertaining to the 'uncertainties' that are defined by the 'catalog of uncertainty templates' 66, a 'realization tree' 46, similar to the 'Realization Trees' of FIGS. 6, 8, and 11, is created by the processor 20a of the computer system 20 of FIG. 3. That 'Realization Tree' (an example of which is shown in FIGS. 6, 8, and 11) is adapted for recordation or display on the Display Screen 20d1 of the 'Recorder or Display device' 20d of FIG. 3 and is stored in the 'database' represented by the memory 20c of FIG. 3. Recall that the 'hierarchical nature' of the 'Realization Tree' of FIGS. 6 and 11 indicates that there is a multiplicative effect on the total number of realizations as each 'uncertainty' is added (see step 40 of FIG. 5). In particular, in FIG. 15, when creating/updating a realization tree (step 40), a realization tree is created (step 40a), the state of the realization tree branches are edited (step 40b), and decisions are captured (step 40c). As a result of the above referenced interaction by the user with the Uncertainty Management Software 22, when an oil and/or gas reservoir is developed, new data is acquired, analysis is performed, and 'uncertainty' and 'risks' are reduced. As a result, the computer system 20 of FIG. 3 will continuously change the 'quantitative information' and the 'qualitative information' associated with the 'uncertainties' that are defined by the 'catalog of uncertainty templates' 66 (of step 32) when the 'uncertainties' and 'risks' are reduced as a result of the development of the reservoir (see step 44 of FIG. 5). In particular, in FIG. 17, when tracking/visualizing changes (step 44), reports are generated (step 44a), and a Treemap View vs time is generated (step 44b); in addition, in FIG. 17, a snapshot of project data (called "versions") are saved (step 44c), and the versions are compared (step 44d). Consequently, the above referenced information stored in the 'database' (memory 20c) provides an audit trail 82 on the reduction of uncertainty which can be interrogated at future dates for the purposes of making the best decision based on current understanding of uncertainty, establishing best practices on uncertainty handling, and serving as a knowledge base for uncertainty about the reservoir. As shown in FIG. 10, when the uncertainty catalog 66 of FIG. 9 is created, containing the set of uncertainty information, the uncertainty information in the catalog 66 is provided to the computer system 20 of FIG. 3, whereupon the computer system 20 will then generate the Realization Tree 46 (of FIGS. 6, 8, and 11) and the Treemap 48 (of FIG. 7). The Realization Tree 46 and Treemap 48 are used to generate associated risks 72. In addition, the Realization Tree 46 and Treemap 48 are also used to make certain decisions 74. The Realization Tree 46 and Treemap 48 are used by modeling and analysis applications 78 for the purpose of generating analysis results 80, the analysis results 80 being fed back to the Realization Tree 46 and Treemap 48 for the purpose of updating the Realization Tree 46 and Treemap 48. As noted earlier, the process described above and illustrated in FIG. 10 will provide an audit trail 82 for use by management.

The above description of the 'Uncertainty Management Software' being thus described, it will be obvious that the same may be varied in many ways. Such variations are not to be regarded as a departure from the spirit and scope of the claimed method or system or program storage device or computer program, and all such modifications as would be obvious to one skilled in the art are intended to be included within the scope of the following claims.

What is claimed is:

1. A method for assessing uncertainty comprising:
   creating a catalog for uncertainty areas;
   capturing quantitative and qualitative uncertainty data;
   establishing dependencies between uncertainties;
   associating risks to uncertainties;
   associating action plans and tasks to risks;
   creating a realization tree from uncertainty ranges; and
   tracking changes to uncertainties and realizations over time.

2. The method as in claim 1 wherein the catalog is updatable.

3. The method as in claim 2 wherein the uncertainty assessed arises in the context of operation in the oil and gas industry.

4. A program storage device readable by a machine tangibly embodying a program of instructions executable by the machine to perform method steps for assessing uncertainty, said method steps comprising:
   creating a catalog for uncertainty areas;
   capturing quantitative and qualitative uncertainty data;
   establishing dependencies between uncertainties;
   associating risks to uncertainties;
   associating action plans and tasks to risks;
   creating a realization tree from uncertainty ranges; and tracking changes to uncertainties and realizations over time.

5. The program storage device as in claim 4 wherein the catalog is updatable.

6. The program storage device as in claim 5 wherein the uncertainty assessed arises in the context of operation in the oil and gas industry.

7. A system for assessing uncertainty comprising a processor, a data storage system, at least one input device, and at least one output device, and a computer-readable media for storing data, the system comprising:
  means for creating a catalog for uncertainty areas and for storing the catalog in the computer-readable media;
  means for capturing quantitative and qualitative uncertainty data;
  means for establishing dependencies between uncertainties;
  means for associating risks to uncertainties;
  means for associating action plans and tasks to risks;
  means for creating a realization tree from uncertainty ranges; and
  means for tracking changes to uncertainties and realizations over time.

8. The system as in claim 7 further comprising a display capable of displaying a realization tree.

9. A method of uncertainty management adapted for managing uncertainties and risks during the development of a reservoir, comprising:
  determining a set of uncertainties pertaining to the development of said reservoir, said set of uncertainties including qualitative information and quantitative information, the uncertainties being reduced in response to development of said reservoir;
  continuously changing the qualitative information and the quantitative information associated with said set of uncertainties when the uncertainties are reduced in response to development of said reservoir; and
  in response to the continuously changing step, generating a realization tree representative of said set of uncertainties, said uncertainties each having values, said realization tree having one or more realizations depending upon the values of said uncertainties.

10. The method of claim 9, wherein the determining step further comprises establishing dependencies between one or more uncertainties.

11. The method of claim 10, wherein the determining step further comprises determining a set of risk information associated, respectively, with said set of uncertainties pertaining to the development of said reservoir, a risk being associated with each uncertainty.

12. The method of claim 11, wherein the determining step further comprises determining a set of risk mitigation action plans and a corresponding set of tasks associated, respectively, with said set of risk information, a risk mitigation action plan and a task being associated with each risk of said set of risk information.

13. A program storage device readable by a machine tangibly embodying a program of instructions executable by the machine to perform method steps for uncertainty management adapted for managing uncertainties and risks during the development of a reservoir, said method steps comprising:
  determining a set of uncertainties pertaining to the development of said reservoir, said set of uncertainties including qualitative information and quantitative information, the uncertainties being reduced in response to development of said reservoir;
  continuously changing the qualitative information and the quantitative information associated with said set of uncertainties when the uncertainties are reduced in response to development of said reservoir; and
  in response to the continuously changing step, generating a realization tree representative of said set of uncertainties, said uncertainties each having values, said realization tree having one or more realizations depending upon the values of said uncertainties.

14. The program storage device of claim 13, wherein the determining step further comprises establishing dependencies between one or more uncertainties.

15. The program storage device of claim 14, wherein the determining step further comprises determining a set of risk information associated, respectively, with said set of uncertainties pertaining to the development of said reservoir, a risk being associated with each uncertainty.

16. The program storage device of claim 15, wherein the determining step further comprises determining a set of risk mitigation action plans and a corresponding set of tasks associated, respectively, with said set of risk information, a risk mitigation action plan and a task being associated with each risk of said set of risk information.

17. A computer program stored in a processor readable medium and adapted to be executed by the processor, said program, when executed by said processor, conducting a process for uncertainty management adapted for managing uncertainties and risks during the development of a reservoir, said process comprising:
  determining a set of uncertainties pertaining to the development of said reservoir, said set of uncertainties including qualitative information and quantitative information, the uncertainties being reduced in response to development of said reservoir;
  continuously changing the qualitative information and the quantitative information associated with said set of uncertainties when the uncertainties are reduced in response to development of said reservoir; and
  in response to the continuously changing step, generating a realization tree representative of said set of uncertainties, said uncertainties each having values, said realization tree having one or more realizations depending upon the values of said uncertainties.

18. The computer program of claim 17, wherein the determining step further comprises establishing dependencies between one or more uncertainties.

19. The computer program of claim 18, wherein the determining step further comprises determining a set of risk information associated, respectively, with said set of uncertainties pertaining to the development of said reservoir, a risk being associated with each uncertainty.

20. The computer program of claim 19, wherein the determining step further comprises determining a set of risk mitigation action plans and a corresponding set of tasks associated, respectively, with said set of risk information, a risk mitigation action plan and a task being associated with each risk of said set of risk information.

21. A method of uncertainty management adapted for managing uncertainties and risks during the development of a reservoir, comprising:
  (a) determining a set of uncertainties pertaining to the development of a reservoir, the set of uncertainties including both qualitative and quantitative assessments of uncertainty, and determining how the qualitative and quantitative assessments of uncertainty pertaining to the development of the reservoir evolve over time, the determining step (a) including, (a1) creating a catalog for uncertainty areas,
(a2) capturing quantitative and qualitative uncertainty data that is defined by the catalog,
(a3) establishing dependencies between uncertainties,
(a4) associating risks to uncertainties,
(a5) associating action plans and tasks to risks,
(a6) creating a realization tree from uncertainty ranges, and
(a7) tracking changes to uncertainties and realizations over time.

22. The method of claim 21, wherein the creating step (a1) comprises: creating an uncertainty catalog; creating an uncertainty category; and creating an uncertainty template.

23. The method of claim 22, wherein the establishing step (a3) comprises: identifying dependent uncertainties, and capturing a relationship between a dependent uncertainty and a parent uncertainty.

24. The method of claim 23, wherein the associating step (a5) for associating action plans and tasks to risks comprises: creating an action plan and associating the action plan with a risk, creating tasks, and associating the tasks with the action plan.

25. The method of claim 24, wherein the creating step (a6) for creating a realization tree comprises: creating a realization tree, editing a state of realization tree branches, and capturing decisions from the edited realization tree.

26. The method of claim 25, wherein the tracking changes step (a7) comprises: generating reports, generating a treemap view versus time adapted for visualizing changes to uncertainties over time in order to determine how an uncertainty and a risk have evolved over time during the course of a project, saving a snapshot of project data, and comparing versions of said project data.

27. A program storage device readable by a machine tangibly embodying a set of instructions executable by the machine to perform method steps for uncertainty management adapted for managing uncertainties and risks during the development of a reservoir, the method steps comprising:
(a) determining a set of uncertainties pertaining to the development of a reservoir, the set of uncertainties including both qualitative and quantitative assessments of uncertainty, and determining how the qualitative and quantitative assessments of uncertainty pertaining to the development of the reservoir evolve over time, the determining step (a) including,
(a1) creating a catalog for uncertainty areas,
(a2) capturing quantitative and qualitative uncertainty data that is defined by the catalog,
(a3) establishing dependencies between uncertainties,
(a4) associating risks to uncertainties,
(a5) associating action plans and tasks to risks,
(a6) creating a realization tree from uncertainty ranges, and
(a7) tracking changes to uncertainties and realizations over time.

28. The program storage device of claim 27, wherein the creating step (a1) comprises: creating an uncertainty catalog; creating an uncertainty category; and creating an uncertainty template.

29. The program storage device of claim 28, wherein the establishing step (a3) comprises: identifying dependent uncertainties, and capturing a relationship between a dependent uncertainty and a parent uncertainty.

30. The program storage device of claim 29, wherein the associating step (a5) for associating action plans and tasks to risks comprises: creating an action plan and associating the action plan with a risk, creating tasks, and associating the tasks with the action plan.

31. The program storage device of claim 30, wherein the creating step (a6) for creating a realization tree comprises: creating a realization tree, editing a state of realization tree branches, and capturing decisions from the edited realization tree.

32. The program storage device of claim 31, wherein the tracking changes step (a7) comprises: generating reports, generating a treemap view versus time adapted for visualizing changes to uncertainties over time in order to determine how an uncertainty and a risk has evolved over time during the course of a project, saving a snapshot of project data, and comparing versions of said project data.

33. A method, practiced by a computer system, for uncertainty management adapted for managing uncertainties and risks during the development of a reservoir, the computer system including a processor, a memory for storing a software, and a recorder or display device adapted for generating an output display, the processor receiving information contained within an uncertainty catalog wherein said information includes uncertainty and risk information pertaining to the development of the reservoir, the uncertainty and risk information being provided to said processor, comprising:
(a) executing, by the processor, the software stored in the memory in response to the uncertainty and risk information being received from the uncertainty catalog,
(b) in response to the executing step, generating, by the processor, a set of qualitative and a set of quantitative assessments of uncertainty pertaining to the development of a reservoir,
(c) in response to the generating step (b), generating, by the processor, a realization tree and a treemap, the realization tree including levels of uncertainty, the treemap being adapted for visualizing changes to uncertainties over time in order to determine how an uncertainty and a risk have evolved over time during the course of a project, and
(c) recording or displaying, by the recorder or display device, the qualitative and quantitative assessments of uncertainty, the realization tree, and the treemap on one or more of the output displays.

34. The method of claim 33, wherein the step of generating, by the processor, a set of qualitative and a set of quantitative assessments of uncertainty pertaining to the development of a reservoir comprises:
receiving the uncertainty catalog which defines uncertainty areas pertaining to the development of a reservoir, and capturing quantitative and qualitative uncertainty data that is defined by the catalog.

35. The method of claim 34, wherein the step of generating, by the processor, a realization tree and a treemap comprises:
establishing dependencies between uncertainties,
associating risks to uncertainties,
associating action plans and tasks to risks,
creating the realization tree from uncertainty ranges, and
tracking changes to uncertainties and realizations over time, the tracking step including generating the treemap.

36. A program storage device readable by a machine tangibly embodying a set of instructions executable by the machine to perform method steps, which are practiced by a computer system, for uncertainty management adapted for managing uncertainties and risks during the development of a reservoir, the computer system including a processor, a memory for storing a software, and a recorder or display device adapted for generating an output display, the processor receiving information contained within an uncertainty catalog wherein said information includes uncertainty and risk information pertaining to the development of the reservoir, the uncertainty and risk information being provided to said processor, the method steps comprising:
(a) executing, by the processor, the software stored in the memory in response to the uncertainty and risk information being received from the uncertainty catalog,
(b) in response to the executing step, generating, by the processor, a set of qualitative and a set of quantitative assessments of uncertainty pertaining to the development of a reservoir,
(c) in response to the generating step (b), generating, by the processor, a realization tree and a treemap, the realization tree including levels of uncertainty, the treemap being adapted for visualizing changes to uncertainties over time in order to determine how an uncertainty and a risk have evolved over time during the course of a project, and
(c) recording or displaying, by the recorder or display device, the qualitative and quantitative assessments of uncertainty, the realization tree, and the treemap on one or more of the output displays.

37. The program storage device of claim 36, wherein the step of generating, by the processor, a set of qualitative and a set of quantitative assessments of uncertainty pertaining to the development of a reservoir comprises:
receiving the uncertainty catalog which defines uncertainty areas pertaining to the development of a reservoir, and
capturing quantitative and qualitative uncertainty data that is defined by the catalog.

38. The program storage device of claim 37, wherein the step of generating, by the processor, a realization tree and a treemap comprises:
establishing dependencies between uncertainties,
associating risks to uncertainties,
associating action plans and tasks to risks,
creating the realization tree from uncertainty ranges, and
tracking changes to uncertainties and realizations over time, the tracking step including generating the treemap.

39. A method of uncertainty management adapted for managing uncertainties and risks during the development of a reservoir, comprising:
determining a set of uncertainties pertaining to the development of said reservoir, said set of uncertainties including qualitative information and quantitative information, the uncertainties being reduced in response to development of said reservoir;
continuously changing the qualitative information and the quantitative information associated with said set of uncertainties when the uncertainties are reduced in response to development of said reservoir; and
in response to the continuously changing step, generating a visualization of uncertainty.

40. The method of claim 39, wherein the visualization of uncertainty includes a realization tree which includes levels of uncertainty.

41. The method of claim 39, wherein the visualization of uncertainty includes a treemap adapted for visualizing changes to uncertainties over time in order to determine how an uncertainty and a risk have evolved over time during the course of a project.

42. A program storage device readable by a machine tangibly embodying a set of instructions executable by the machine to perform method steps of uncertainty management adapted for managing uncertainties and risks during the development of a reservoir, said method steps comprising:
determining a set of uncertainties pertaining to the development of said reservoir, said set of uncertainties including qualitative information and quantitative information, the uncertainties being reduced in response to development of said reservoir;
continuously changing the qualitative information and the quantitative information associated with said set of uncertainties when the uncertainties are reduced in response to development of said reservoir; and
in response to the continuously changing step, generating a visualization of uncertainty.

43. The program storage device of claim 42, wherein the visualization of uncertainty includes a realization tree which includes levels of uncertainty.

44. The program storage device of claim 42, wherein the visualization of uncertainty includes a treemap adapted for visualizing changes to uncertainties over time in order to determine how an uncertainty and a risk have evolved over time during the course of a project.

45. A computer program stored in a processor readable medium and adapted to be executed by the processor, the computer program, when executed by the processor, conducting a process of uncertainty management adapted for managing uncertainties and risks during the development of a reservoir, the process comprising: determining a set of uncertainties pertaining to the development of said reservoir, said set of uncertainties including qualitative information and quantitative information, the uncertainties being reduced in response to development of said reservoir;
continuously changing the qualitative information and the quantitative information associated with said set of uncertainties when the uncertainties are reduced in response to development of said reservoir; and
in response to the continuously changing step, generating a visualization of uncertainty.

46. The computer program of claim 45, wherein the visualization of uncertainty includes a realization tree which includes levels of uncertainty.

47. The computer program of claim 45, wherein the visualization of uncertainty includes a treemap adapted for visualizing changes to uncertainties over time in order to determine how an uncertainty and a risk have evolved over time during the course of a project.

48. A system of uncertainty management adapted for managing uncertainties and risks during the development of a reservoir, comprising:
first apparatus adapted for determining a set of uncertainties pertaining to the development of said reservoir, said set of uncertainties including qualitative information and quantitative information, the uncertainties being reduced in response to development of said reservoir;
second apparatus adapted for continuously changing the qualitative information and the quantitative information associated with said set of uncertainties when the uncertainties are reduced in response to development of said reservoir; and
third apparatus, responsive to the continuously changing associated with the second apparatus, adapted for generating a visualization of uncertainty.

49. The system of claim 48, wherein the visualization of uncertainty includes a realization tree which includes levels of uncertainty.

50. The system of claim 48, wherein the visualization of uncertainty includes a treemap adapted for visualizing changes to uncertainties over time in order to determine how an uncertainty and a risk have evolved over time during the course of a project.

* * * * *